(12) United States Patent
Fellin et al.

(10) Patent No.: US 7,103,884 B2
(45) Date of Patent: Sep. 5, 2006

(54) METHOD FOR MAINTAINING CONSISTENCY AND PERFORMING RECOVERY IN A REPLICATED DATA STORAGE SYSTEM

(75) Inventors: Jeffrey K Fellin, Somerville, NJ (US); Michael E Flaster, Tenafly, NJ (US); Eran Gabber, Summit, NJ (US); Fengrui Gu, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 611 days.

(21) Appl. No.: 10/107,829

(22) Filed: Mar. 27, 2002

(65) Prior Publication Data

US 2004/0078637 A1    Apr. 22, 2004

(51) Int. Cl.
*G06F 9/44* (2006.01)
*G06F 15/173* (2006.01)
*G06G 11/00* (2006.01)
*G06F 12/00* (2006.01)

(52) U.S. Cl. .................. 717/169; 707/202; 709/223; 709/226; 714/2

(58) Field of Classification Search ........ 717/168–178; 707/202, 203, 2; 709/200–226; 714/2
See application file for complete search history.

(56) References Cited

U.S. PATENT DOCUMENTS

| | | | | |
|---|---|---|---|---|
| 4,503,494 | A * | 3/1985 | Hamilton et al. | 365/229 |
| 6,356,916 | B1 * | 3/2002 | Yamatari et al. | 707/201 |
| 6,631,453 | B1 * | 10/2003 | Friday | 711/163 |
| 6,671,782 | B1 * | 12/2003 | Menon | 711/145 |
| 6,763,436 | B1 * | 7/2004 | Gabber et al. | 711/146 |
| 6,938,084 | B1 * | 8/2005 | Gamache et al. | 709/226 |
| 2003/0145179 | A1 * | 7/2003 | Gabber et al. | 711/162 |

(Continued)

OTHER PUBLICATIONS

A. Silberschatz, et al. "Database System Concepts", McGraw-Hill Computer Science Series, 1996, pp. 511-540.

(Continued)

*Primary Examiner*—Antony Nguyen-Ba
*Assistant Examiner*—Isaac Tecklu
(74) *Attorney, Agent, or Firm*—Stephen M. Gurey

(57) ABSTRACT

A recovery process allows a recovering replica in a replicated data storage system to recover from a current replica the changes to the data that it has missed during a failure while, at the same time, the system is processing new requests issued by the source. Sequence numbers, assigned by the source to write requests and stored by each replica in association with the data item that the write request modifies, are used by the recovery process to determine when a replica has missed one or more write requests and requires recovery. During recovery, the recovering replica ignores all requests directly received from the source, and replaces the contents of a data item with the data received from the current replica only if the newly received data item has a higher sequence number than the corresponding sequence number of the data item already stored in the recovering replica. It also updates data items in response to new write requests that are forwarded to it by the current replica. At the same time, the current replica continues to receive requests from the source, performs those requests, and forwards those write requests to the recovering replica. It also scans its data items and sends to the recovering replica those data items and associated sequence numbers that have a sequence number higher than the sequence number of the last consecutive write request sent by the source that the recovering replica received before missing a write request.

15 Claims, 14 Drawing Sheets

U.S. PATENT DOCUMENTS

2003/0188218 A1* 10/2003 Lubbers et al. .............. 714/5
2004/0078637 A1* 4/2004 Fellin et al. .................. 714/6

OTHER PUBLICATIONS

Sun StorEdge™ Network Data Replicator Software Boosts Data Center Resilience http://www.sun.com/storage/white-papers/sndr.html, Feb. 27, 2002.

C. Mohan, "Commit_LSN: A Novel And Simple Method For Reducing Locking And Latching In Transaction Processing Systems", Proc. Of the 16th International Conference on Very Large Data Bases, Aug. 13-16, 1990, pp. 406-418.

R. P. King et al, "Management Of A Remote Backup Copy For Disaster Recovery", ACM Transactions On Database Systems, vol. 16, No. 2, Jun. 1991, pp. 338-368.

* cited by examiner

FIG. 5

| REQUEST | LOW | HIGH | COMMENTS |
|---|---|---|---|
| | 0 | 0 | INITIAL VALUE |
| $write_1$ | 1 | 1 | |
| $write_2$ | 2 | 2 | |
| $read_1$ | 2 | 2 | READ DOES NOT CHANGE THE LOW AND HIGH COUNTERS |
| $write_2$ | 2 | 2 | WRITE IGNORED (A DUPLICATE) |
| $write_3$ | 3 | 3 | |
| $write_5$ | 3 | 5 | DETECTED A WRITE GAP; ONLY HIGH IS CHANGED |
| $read_2$ | 3 | 5 | READ FAILS SINCE SOME WRITES ARE MISSING |
| $write_6$ | 3 | 6 | ONLY HIGH IS CHANGED SINCE SOME WRITES ARE MISSING |
| $write_4$ | 3 | 6 | WRITE IS IGNORED AND GAP NOT CLOSED |

| REQUESTS STREAM | FINAL VALUES |
|---|---|
| $W_1, W_2, W_3, W_4, W_5$ | LOW=5, HIGH=5 |
| $W_1, W_2, W_5$ | LOW=2, HIGH=5 |

FIG. 10

| REQUEST # | DATA ITEM # | NEW VALUE | DATA CONTENTS | | | LAST_MODIFIED | | |
|---|---|---|---|---|---|---|---|---|
| | | | 1 | 2 | 3 | 1 | 2 | 3 |
| INITIAL | | | – | – | – | 0 | 0 | 0 |
| 1 | 1 | A | A | – | – | 1 | 0 | 0 |
| 2 | 2 | B | A | B | – | 1 | 2 | 0 |
| 3 | 3 | C | A | B | C | 1 | 2 | 3 |
| 4 | 2 | D | A | D | C | 1 | 4 | 3 |
| 5 | 3 | E | A | D | E | 1 | 4 | 5 |
| 6 | 3 | F | A | D | F | 1 | 4 | 6 |
| 7 | 2 | G | A | G | F | 1 | 7 | 6 |

FIG. 11

| ACTIVITY | RECOVERING REPLICA (R) | | | | | CURRENT REPLICA (C) | | | | | |
|---|---|---|---|---|---|---|---|---|---|---|---|
| | DATA ITEMS/ LAST_MODIFIED | | | COUNTERS | | DATA ITEMS/ LAST_MODIFIED | | | COUNTERS | | |
| | 1 | 2 | 3 | LOW | HIGH | 1 | 2 | 3 | LOW | HIGH | POS |
| RECOVERY STARTS | A/1 | B/2 | C/3 | 3 | 3 | A/1 | D/4 | E/5 | 5 | 5 | 0 |
| R SENDS LOW=3 TO C | A/1 | B/2 | C/3 | 3 | 3 | A/1 | D/4 | E/5 | 5 | 5 | 0 |
| C SENDS HIGH=5 TO R | A/1 | B/2 | C/3 | 3 | 5 | A/1 | D/4 | E/5 | 5 | 5 | 0 |
| C GETS WRITE$_6$ FROM S | A/1 | B/2 | C/3 | 3 | 5 | A/1 | D/4 | F/6 | 6 | 6 | 0 |
| C SENDS WRITE$_6$ TO R | A/1 | B/2 | F/6 | 3 | 6 | A/1 | D/4 | F/6 | 6 | 6 | 0 |
| C SENDS DATA ITEM 2 TO R | A/1 | D/4 | F/6 | 3 | 6 | A/1 | D/4 | F/6 | 6 | 6 | 2 |
| C GETS WRITE$_7$ FROM S | A/1 | D/4 | F/6 | 3 | 6 | A/1 | G/7 | F/6 | 7 | 7 | 2 |
| C SENDS WRITE$_7$ TO R | A/1 | G/7 | F/6 | 3 | 7 | A/1 | G/7 | F/6 | 7 | 7 | 2 |
| C SENDS DATA ITEM 3 TO R (R IGNORES ITEM 3) | A/1 | G/7 | F/6 | 3 | 7 | A/1 | G/7 | F/6 | 7 | 7 | 3 |
| C COMPLETES DATA SCAN | A/1 | G/7 | F/6 | 3 | 7 | A/1 | G/7 | F/6 | 7 | 7 | 3 |
| C SENDS SCAN COMPLETE MESSAGE TO R | A/1 | G/7 | F/6 | 7 | 7 | A/1 | G/7 | F/6 | 7 | 7 | 3 |

| ACTIVITY | RECOVERING REPLICA (R) | | | CURRENT REPLICA (C) | | |
|---|---|---|---|---|---|---|
| | DATA ITEMS | | LAST_MODIFIED | DATA ITEMS | | LAST_MODIFIED |
| | 1 | 2 | | 1 | 2 | |
| INITIAL | A | B | 5 | C | D | 10 |
| C RECEIVES WRITE$_{11}$ TO ITEM 2 FROM S | A | B | 5 | C | E | 11 |
| C SENDS WRITE$_{11}$ TO R | A | E | 11 | C | E | 11 |
| C SENDS CLUSTER 1 TO R WITH LAST_MODIFIED =11 | A | E | 11 | C | E | 11 |
| R IGNORES CLUSTER 1 | A | E | 11 | C | E | 11 |

METHOD FOR MAINTAINING CONSISTENCY AND PERFORMING RECOVERY IN A REPLICATED DATA STORAGE SYSTEM

TECHNICAL FIELD

This invention relates to information storage systems that include multiple replicas of the information and, more particularly, to maintaining data consistency between the replicas during normal operation and upon recovery from a failure.

BACKGROUND OF THE INVENTION

Information is the most crucial asset of many businesses, and any disruption to the access of this information may cause extensive damage. Some businesses, such as banks, airlines (with e-tickets), auction sites, and on-line merchants, may actually stop functioning without access to their information. No matter how reliable a data center is, there can still be site failures—floods, earthquakes, fires, etc.—that can destroy the data stored on a storage device and any co-located backup media.

Geographic replication is the only way to avoid service disruptions. Geographic replication has challenges: performance needs to be maintained; different sites might run at different speeds, and have different latencies. Having multiple remote copies may increase reliability, but for most purposes the replicas need to be kept in sync, in real time. If a site fails and comes back on-line, its data need to be recovered without an excessive impact on the rest of the system. Generally, when a failure occurs, a replica that does not contain up-to-date data needs to recover from another site that does contain up-to-date data.

In a replicated storage system, it is desirable to keep a plurality of replicas of data consistent in spite of failures. The data consists of plural data items, which may be disk blocks or any other information. In a replicated storage system, a source, such as a host computer, issues a sequence of requests, which may be either read or write requests to a particular data item or to a group of data items. A data item is the smallest unit that can be read or written in one request. Read and write requests are atomic in the sense that they are either executed completely or not at all. In other words, there is no possibility that a data item will contain a mixture of old and new information after a write request of this data item is executed.

Generally, a replicated storage system consists of a source and a plurality of replicas connected with a communication network, as for example, an IP network such as the Internet. The source, such as a host computer, receives the requests from the outside world, and/or generates them internally. The source sends write requests to all of the replicas in the system, and sends read requests to one or more of the replicas. The replicas keep the data in a non-volatile storage device, such as a magnetic disk or a non-volatile memory (e.g., a non-volatile random access memory [NVRAM]), so that the data is not lost when the replica fails. Requests are sent to all replicas in the same order.

The source communicates with the replicas using a reliable communication protocol, such as TCP/IP, which ensures that the information sent by the source is received by the replicas without reordering or corruption. In case of a full or partial network failure, the affected replicas are disconnected from the source and do not receive any further communication from it. When a replica fails, it stops updating its data (a fail-stop assumption).

A system containing multiple replicas is said to be consistent if all of the replicas contain the same data after the source stops sending write requests and all outstanding write requests have been processed by all of the replicas. In other words, a definition of consistency is that each replica contains the identical data after all of the replicas have finished processing the same sequence of write requests.

A replicated storage system needs to keep the data consistent after a failure. A failure can be of the source, the network, or one or more of the replicas. The system thus needs to recover any missed changes to the data in a replica due to failures. If the source failed, no data was changed during the failure. Thus, after the source recovers, no additional operation needs be performed with respect to any of the replicas to maintain consistency. Similarly, a complete network failure requires no additional operation with respect to the replicas since no data was changed during the network failure, because all write requests must pass through the network in order to reach the replicas. A replica failure causes the affected replica to miss some write requests that the other replicas performed; the failed replica needs to recover these requests in order to become consistent again. A partial network failure prevents communication between the source and some of the replicas. Since the affected replicas fail to receive some write requests, recovery of the affected replicas needs to be handled in the same way as a replica failure.

A recovery process is needed to ensure that by the end of the recovery the affected replica will contain the same data as the other replicas that did not fail. In other words, a recovery process is used to achieve consistency after a replica failure or a partial network failure by allowing the affected replica to recover the changes to the data that it missed during the failure. A problem arises, however, in that during recovery period, new write requests to the data are likely made from the source.

In some prior art systems (see, e.g., Sun Microsystems, "Sun StoreEdge™ Network Data Replicator Software Boosts Data Center Resilience", White Paper, http://www-.sun.com/storage/white-papers/sndr.html), only two replicas (primary and remote copies) are possible since the replicas use a scoreboard of bit values to track data changes during a single failure. This prior art system does not specify if the source can issue write requests while the recovery is in progress. In other prior art methods (see, e.g., Richard P. King, Nagui Halim, Hector Garcia-Molina, and Christos A. Polyzois, "Management of a Remote Backup Copy for Disaster Recovery", *ACM Transactions on Database Systems*, Volume 16, Number 2, June 1991, pp. 338–368), the source is allowed to continue making write requests while the recovery is in progress, but requires that the entire contents of the current replica to be copied to the affected replica. This may cause the current replica to transfer more data than necessary, which lengthens the duration of the recovery. A longer recovery reduces the reliability of the entire system, since a replica that is not operational cannot protect the system from further failures. In prior art database recovery (see, e.g., Abraham Silberschatz, Henry F. Korth, and S. Sudarshan, "Database System Concepts ($3^{rd}$ Edition)", McGraw-Hill, 1997, Chapter 15, pp. 511–531), a single copy of the data is recovered from the transactions log. Also, the source is prohibited from making write requests while the recovery is in progress.

An efficient recovery process is needed for a replicated data storage system, therefore, that does not require the source to stop generating write requests while recovery is taking place, and minimizes the amount of information that is transferred to the recovering replica in order to make it consistent with the other replicas in the system.

SUMMARY OF THE INVENTION

The recovery process of the present invention achieves consistency after a replica or a partial network failure. As previously noted, there is no need to perform recovery after a complete network failure. The recovery process allows the recovering replica to recover the changes to the data that it has missed during the failure while, at the same time, the system is processing new requests issued by the source. As noted, it is important that the recovering replica be capable of accepting new requests during the recovery period since the recovery of missed changes to the data may be slower than the arrival rate of new requests. Thus, if the recovering replica fails to process new write requests while recovering the changes it previously missed, it may never be able to fill the gap of missed write requests.

In accordance with the recovery process of the present invention, a recovering replica ignores all new requests received directly from the source and only processes new requests that are forwarded to it by the current replica. It receives from the current replica updates to data items that it missed and replaces values of those data items if the values received from the current replica are more recent than the values already at the recovering replica. The current replica receives the identity of the last consecutive write request sent by the source that the recovering replica received before missing a write request. The current replica sends to the recovering replica the values of those data items that were updated by write requests later than the aforementioned last consecutive write request received from the recovering replica. In addition, the current replica receives new write requests from the source, processes them, and forwards them to the recovering replica.

The disclosed embodiments of the recovery process of the present invention use sequence numbers to determine when a replica is not up-to-date and requires recovery. The up-to-date property is defined below. Sequence numbers are integers, which are assigned by the source in increasing order, preferably in increments of one without gaps, to read and write requests. Separate consecutive sequences are assigned to read requests and write requests. The assigned sequence number of a write request is sent to each replica, and it is stored by the replica in association with the data item that was modified by the write request. In other words, the sequence number associated with a particular data item is the sequence number of the last write request that modified that data item. That is why the sequence number associated with the data item is hereinafter referred to as last_modified. The last_modified counter is stored in a non-volatile storage device, which is non-volatile memory in the preferred embodiment, to prevent its loss upon a replica failure. Each replica also maintains a high counter in non-volatile memory that contains the sequence number of the highest write request ever processed by the replica. Each replica also maintains a low counter in non-volatile memory that contains the sequence number of the highest write request for which all write requests from the first ever request to this low count have been processed by the replica, i.e., there are no gaps in the sequence numbers of requests processed by the replica through the sequence number stored in the low counter. When a replica's low counter equals its high counter, the replica is considered up-to-date, and either it did not miss any write request ever or it recovered successfully and did not miss any write request since that recovery. When the replica's low counter is less than its high counter, the replica is considered to be not up-to-date, indicating that the replica has missed some write requests and needs to recover.

The preferred embodiment stores the low counter, high counter and last_modified counters in non-volatile memory and not in slower non-volatile storage devices, such as magnetic disks. The reason is that these counters are accessed frequently during normal operation and during recovery. Placing them on a magnetic disk will slow the system considerably, since access to a disk is much slower than access to non-volatile memory. The disadvantages of non-volatile memory are its high cost and smaller size relative to a magnetic disk.

The recovery process enables new write requests issued by the source to be processed while a replica is recovering from a current replica in the system, and minimizes the data that needs to be copied from and transferred from a current replica to the recovering replica. A current replica is an up-to-date replica that has received the latest write request from the source or the latest write is in transit to this replica. Using the low and high counters of the recovering replica, and the last_modified sequence numbers associated with each data item stored in the recovering replica and the current replica, the current replica sends to the recovering replica only those data items (and associated sequence numbers) that have a sequence number greater than the recovering replica's low counter. Also, during the recovery period, the current replica sends to the recovering replica any new current write requests received from the source.

From the standpoint of the recovering replica during the recovery period, the recovering replica ignores all requests (read and write) directly received from the source, and replaces the contents of a data item with the data received from the current replica only if the newly received data item has a higher sequence number than the corresponding sequence number of the data item already stored in the recovering replica. It also updates data items in response to new write requests that were forwarded to it by the current replica.

From the standpoint of the current replica from which the recovering replica is recovering, the current replica continues to receive requests from the source, processes those requests (i.e., modifies one or more data items if it receives a write request), and forwards those write requests to the recovering replica. It also scans its data items and sends to the recovering replica those data items and associated sequence numbers that have a sequence number higher than the recovering replica's low counter.

In a second embodiment of the recovery process, during the scan, rather than sending each data item that has a sequence number higher than the recovering replica's low counter, those data items that have been modified by a write request and already forwarded from the current replica to the recovery replica during the recovery period are eliminated from the transfer.

In a third embodiment, the data items are divided into clusters containing multiple data items. During the data scan, clusters of data items rather than single data items are transferred from the current replica to the recovering replica. In this embodiment, the last_modified sequence numbers relate to clusters rather than data items. Advantageously, the amount of non-volatile memory required in each replica to store these last_modified sequence numbers is reduced since the last_modified counter needs to be stored only per cluster and not per item. Communication efficiency is also improved by transferring clusters and not data items between the current replica and the recovering replica. Reading and writing multiple data items as clusters rather than as individual data items also reduces storage device access time.

In a fourth embodiment, the amount of data sent from the current replica to the recovering replica is further reduced. In this embodiment, as in the second embodiment, every cluster is sent at most once during the recovery period. If a cluster was already sent during either the data scan or by forwarding a received request, the cluster is not sent again during the recovery period.

BRIEF DESCRIPTION OF THE DRAWING

FIG. 5 is a table that illustrates the processing of requests by a replica;

FIG. 10 is a table that illustrates the processing of write requests and shows data contents over time;

FIG. 11 is a table that illustrates the operation of the first embodiment of the present invention;

DETAILED DESCRIPTION

Figure 1:
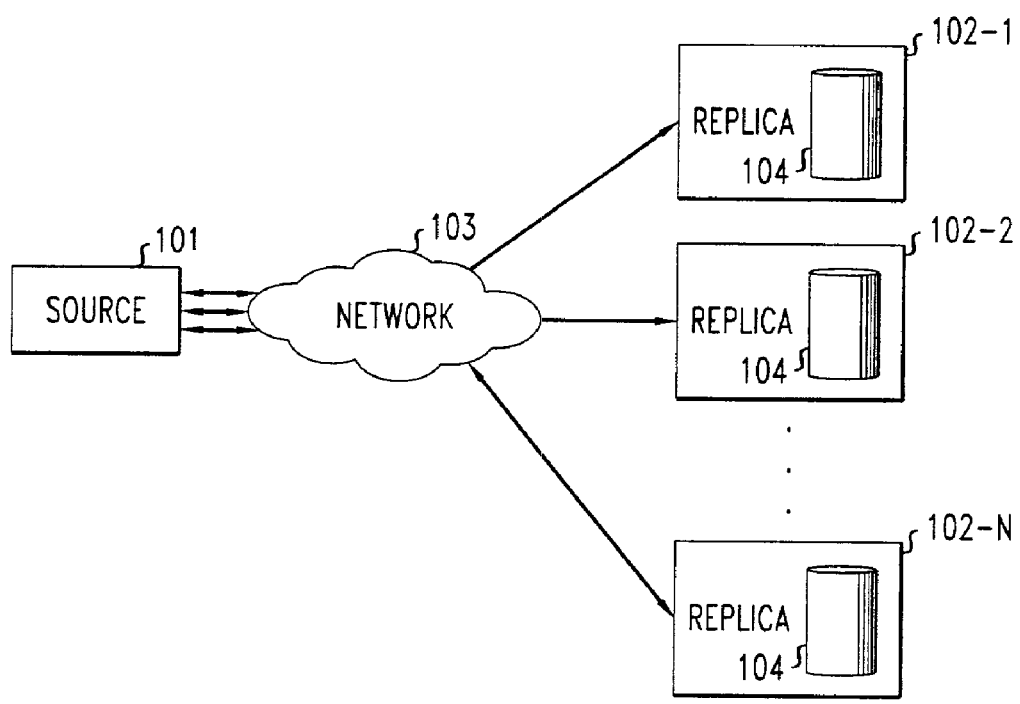
FIG. 1 is a block diagram of a replicated storage system.

FIG. 1 shows the architecture of a replicated storage system including a source 101 and N replicas 102-1–102-N, which are interconnected through a communication network 103. Each of the replicas 102 includes a non-volatile storage device 104, such as a magnetic disk or any other preferably non-volatile storage device (e.g., NVRAM). The advantage of a non-volatile memory is that the data stored on the storage device 104 is not lost should the replica fail. During normal operations, the multiple replicas 102 each contain the same data and provide backup for one another in the event of the failure of one or more of the replicas. The source 101 sends write requests to all of the replicas 102 and sends read request to one or more of the replicas. Requests issued by the source 101 are sent to all the replicas 102 in the same order. The source 101 communicates with the replicas using a reliable communication protocol, such as TCP/IP, which ensures that the information sent by the source is received by the replicas without reordering or corruption.

In the event of a full or partial network failure, the affected replicas are disconnected from the source and do not further communicate with it. When one or more of the replicas 102 fails, it stops updating its data (a fail-stop assumption). A system containing N replicas is generally said to be consistent if all N replicas 102-1–102-N contain the same data after the source stops sending write requests and all outstanding write requests have been processed by all of the replicas, or that all N replicas contain the same data after all of the replicas have processed the same sequence of write requests. A more accurate definition of consistency will be given hereinafter. The recovery process assumes that the source 101 assigns consecutive sequence numbers to the requests.

Figure 2:
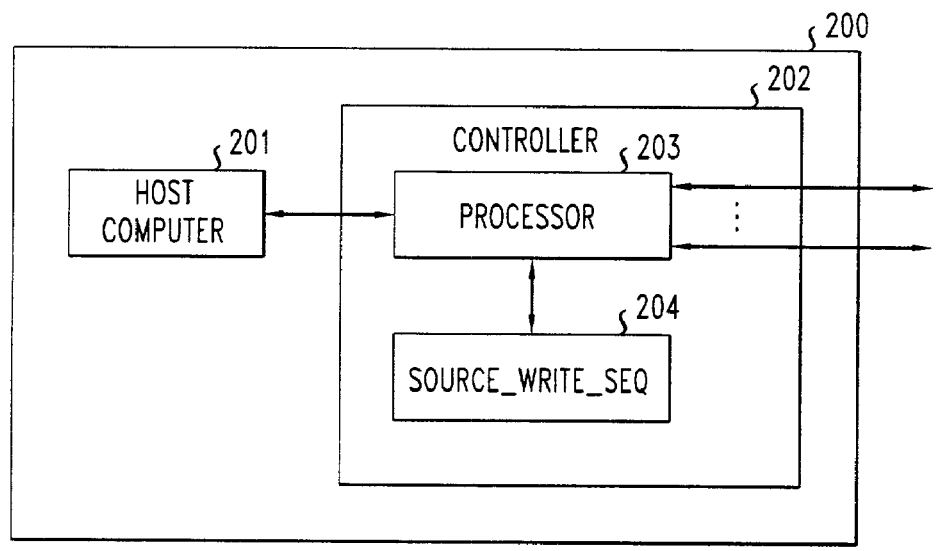
FIG. 2 is a block diagram of the source in the system of FIG. 1.

FIG. 2 is a block diagram of a source 200. It includes a host computer 201 and a controller 202. The host computer generates requests internally or receives them from an external entity. The controller includes a processor 203, which keeps track which replicas in the system are current, attaches sequence number to each write request, and broadcasts each request to all replicas (for write requests) or to one or more replicas (for read requests) over individual TCP/IP sockets or using an appropriate multicast protocol. Processor 203 also tells a replica that requires recovery from which current replica it should recover. The sequence numbers associated with each request are preferably integers and are assigned by processor 203 in increments of one, without gaps, with separate sequences for read and write requests. Thus, if the request stream is read, write, write, read, write, then the source assigns the following sequence number to these request: $read_1$, $write_1$, $write_2$, $read_2$, $write_3$, where the subscripts are indicative of the assigned sequence number.

Read requests are processed by a replica only when it is "up-to-date", to be explained below. The sequence number assigned to the first request ever is 1. Controller 202 keeps the latest assigned write sequence number, source_write-_seq, in a counter 204. It is assumed that sequence numbers never overflow, which is a valid assumption if 64-bit unsigned integers are used to contain sequence numbers, and the request rate of the system is in the order of one million requests per second. The system will then be operative for approximately 580,000 years before the sequence numbers overflow. If the source should fail, a gap in sequence numbers is prevented from occurring in a manner to be described hereinafter.

Figure 3:
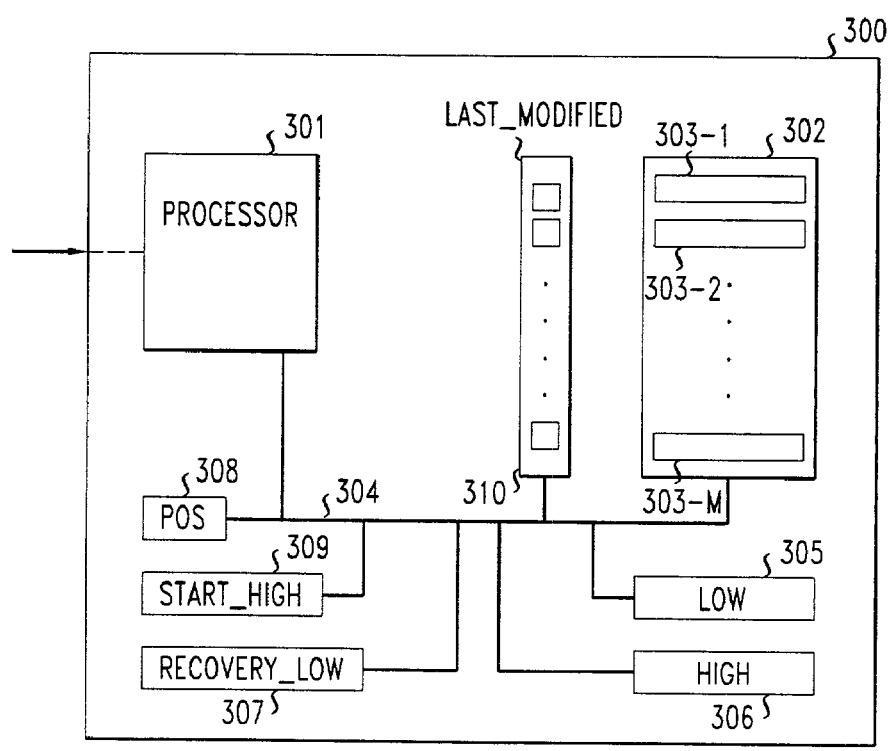
FIG. 3 is a block diagram of a replica in the system of FIG. 1 in accordance with first and second embodiments of the invention.

FIG. 3 is a block diagram of a replica 300. It includes a processor 301, which processes read and write requests received from the source, and non-volatile data storage device 302. The storage device 302 is a magnetic disk in the preferred embodiment. Data storage is illustratively shown storing M data items in data storage positions 303-1–303-M. Processor 301 processes a write request to a particular data item by sending the value of the updated data item over bus 304 to the particular storage position 303 at which that item, identified by its position, is stored and rewriting the previously stored data item with its new value. Processor 301 processes a read request for a particular data item by requesting the value of that data item from its storage position 303, receiving the value of that data item over bus 304, and outputting that data item over the data network to the requesting source over a TCP/IP socket or another suitable protocol.

Replica 300 includes counters 305 and 306, in non-volatile memory (NVRAM), each connected to processor 301 via bus 304. Counter 305 stores the high count, which is the sequence number of the highest write request that has so far been processed by this particular replica. Counter 306 stores the low count, which is the sequence number of the highest write request for which all write requests from the first request (sequence number 1) to the request with this low count sequence number have been processed by this replica, or all requests from the last successful recovery to this low count request have been processed by this replica. In other words, there are no gaps in the sequence numbers of write requests processed by this replica for sequence number less than low. Processor 301 updates the counters 305 and 306 as the replica processes write requests. The initial values of both counters 305 and 306 are zero. When low equals high, the replica is considered to be up-to-date. In other words, the replica did not miss any request ever or it recovered successfully and did not miss any write request since that recovery. When low is less than high, the replica is considered to be not up-to-date. In other words, the replica missed some requests and it needs to recover. Low can never exceed high.

Replica 300 also includes non-volatile storage device 310, connected to processor 301 via bus 304. The non-volatile storage device 310 is non-volatile memory (NVRAM) in the preferred embodiment. Storage device 310 stores an M-element vector, last_modified. Each element of the vector is associated with one of the M storage locations 303 of storage device 302 and contains the sequence number, as previously discussed, of the most recent write request that modified the data item in that storage location. The initial value of each of the M entries of last_modified is zero. Whenever a write request modifies a data item, the sequence number of that write request is stored in a corresponding entry of last_modified. As will be described, low, high, and last_modified are used in performing recovery in both the current and recovering replicas and therefore need be kept in non-volatile storage devices to ensure that they are not lost after a replica failure.

Figure 4:
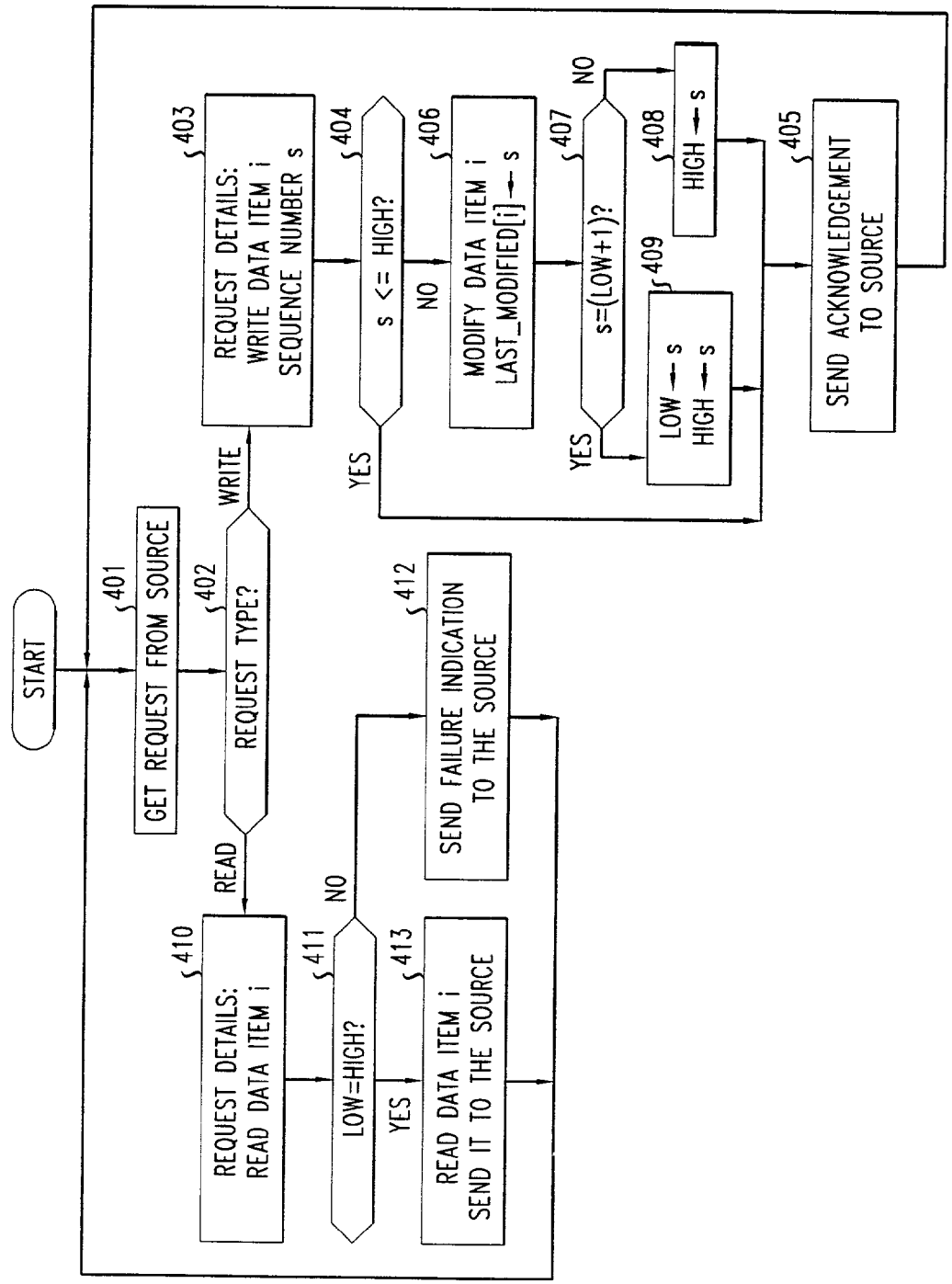
FIG. 4 is a flowchart illustrating the steps that a replica performs in processing requests.

The processing of requests by a replica is shown in the flowchart of FIG. 4. At step 401, the replica receives a request from the source. At step 402, it determines whether the request is a read or a write request. If it is a write request, at step 403, details of that request are determined, specifically, which data item i the write request is for and what the sequence number s of the write request is. At step 404, a determination is made whether s is less than or equal to high. If it is, then the request is considered to be a duplicate and is silently ignored. If s is determined to be greater than high, then, at step 406, data item i is modified with its new value. Also, at step 406, element i of the last_modified vector is set to s. The assignment of a new value to a data item or to a counter is represented with the symbol ←. FIG. 4 and the following figures use this symbol.

At step 407, a determination is made whether the sequence number s of the write request exactly follows the previous write sequence number (i.e., whether s equals low+1). If it does, then the replica is up-to-date (it did not miss any write) and, at step 408, low and high are both set to s. Since it is assumed that the network never re-orders requests (requests either arrive in the correct order or they fail to arrive), it is sufficient to detect a gap in the write request stream when a write request has a sequence number which is larger than the previous write sequence number plus 1. If the missed write request arrives in the future, it is ignored and the gap is not closed since a request is not expected to arrive out of order. Thus, at step 407, if s does not equal low+1, then the replica is not up-to-date and, at step 409, only high is set to s to indicate that the gap exists. Once the replica is considered not up-to-date, it can become up-to-date again only after a successful recovery. Further gaps cause only high to grow, since there is not distinction between a gap caused by missing one request, a gap caused by missing multiple requests, or multiple gaps. After either step 404, 408 or 409, an acknowledgment of the write request is sent to the source at step 405.

If, at step 402, the request received from the source is determined to be a read request, then at step 410, an identification of which data item i the read request relates to is made. If, at step 411, a determination is made that low does not equal high, then the replica is not up-to-date. At step 412, a failure indication is sent to the source, since the replica processes read requests only when it is up-to-date. This ensures that the replica never gives an incorrect answer to a read request due to missed write requests. The recovery algorithm thus does not handle read requests, but safely ignores them. If, at step 411, low and high are equal, then the replica is up-to-date and, at step 413, data item i is read from data location 303-i of data storage 302 and is sent to the source.

The table in FIG. 5 illustrates the request processing operation as the replica processes a sequence of requests. The subscripts of the requests indicate each read or write request's sequence number. Initially low and high are 0. When write request write$_1$, is received, low and high are both increased to 1. When the next write request arrives, write$_2$, its sequence number is equal to low+1 so low and high are both set to 2. The next request is a read request, read$_1$, which does not change the values of low and high. The next request is write$_2$, which is a duplicate of the previous request, and it is ignored. The sequence number of the next request, write$_3$, is equal to low+1, so low and high are both set to 3. The sequence number of the next received request, write$_5$, is not equal to low+1, so a gap is detected. Thus only high is set to 5, with low remaining at 3. The next request is a read request, read$_2$. Since the replica is not up-do-date and some writes are missing, the read request fails. The next request is a write request again, write$_6$. Since a gap has previously been detected, only high is changed to 6. The final request is a write request, write$_4$. This write request is ignored and the gap is not closed.

Figures 6, 7:
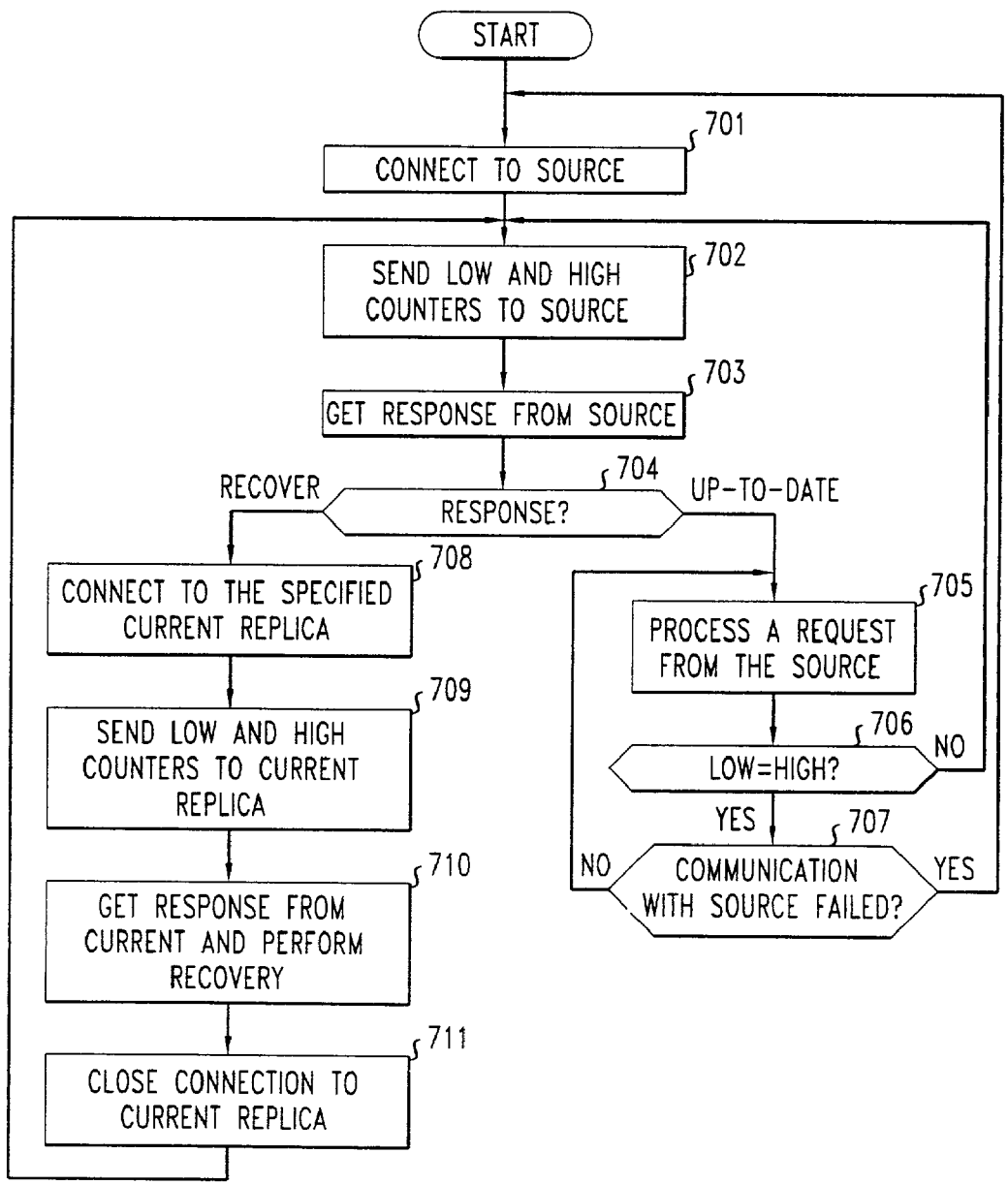
FIG. 6 is a table that illustrates the processing of write requests by a replica.
FIG. 7 is a flowchart that illustrates the operation of a replica.

The table in FIG. 6 shows two examples of processing of write requests and the handling of the low and high counters. In the first example, there is no gap in the processing of write requests $W_1$, $W_2$, $W_3$, $W_4$, $W_5$. The final value of both low and high is thus 5. In the second example, there is a gap in the received write requests $W_1$, $W_2$, $W_5$, so that the final value of low is 2 and the final value of high is 5.

A current replica is an up-to-date replica that received the latest write request from the source or the latest write request is in transit to this replica. In other words, low=high and either high=source_write_seq or all request from high+1 to source_write_seq are in transit to this replica. This condition is equivalent to an up-to-date replica that has an open communication channel to the source. Assuming that the communication channel is reliable (no data is lost in transit) and the absence of bugs in the source and replicas, all requests from high+1 to source_write_seq that are in transit will eventually be processed by the replica without causing any gaps. It should be noted that an up-to-date replica is not necessarily current since the replica may be disconnected from the source.

A consistent system is a system in which all replicas are current. In other words, if the source stops sending new write requests, all replicas will eventually have low=high=source_write_seq.

The up-to-date condition is different than the current and consistent conditions. The up-to-date condition is local to the replica, and can be checked without knowing the state of the source or any other replica. The current condition requires information from the replica and from the source. The consistent condition depends on the state of the entire system. Every replica may be up-to-date even when the system itself is not consistent, for example if some replicas were disconnected from the source and missed the last few write requests.

The overall operation of a replica is shown in FIG. 7. This operation includes the processing of requests of FIG. 4. At step 701, the replica starts by connecting to the source, and, at step 702, sending the source its low and high values. Using the received low and high values, and the value source_write_seq, at step 703, the source sends the replica a response. This response can be either that the replica is up-to-date or that the replica has to recover. The source tells the replica to recover if low<high, or high<source_write_seq, which means that the replica missed some write requests that were sent to the other replicas. If the response determined at step 704, is that the replica is up-to-date, then the replica starts processing requests at step 705 as per the steps in FIG. 4. The replica processes all requests until it either detects a gap (low<high at step 706), or the connection to the source fails, at step 707. The connection to the source may fail due to source or network failures. After such a failure, the replica re-establishes the connection to the source at step 701. If, at step 704, the response is for the replica to recover, then the replica, at step 708, connects to a current replica that the source has chosen and specified. At step 709, the recovering replica's low and high values are sent to that current replica. At step 710, the recovering replica recovers from the current replica using a recovery process to be described in detail below. Once recovery is completed, at step 711, the connection between the now recovered replica and the current replica is closed.

If the source should fail, the source needs to recover only the highest sequence number that it previously used for write requests before its failure (the last value of source_write_seq in counter 204). This is needed to avoid a gap in the write request stream and to ensure that the replicas will not ignore new write requests. A first method to recover the highest sequence number is to keep counter 204 in non-volatile memory or in another non-volatile storage device. When the source restarts, it recovers source_write_seq from this storage device. This method does not require any communication, but it assumes that the source hardware does not completely fail, so that the contents of the storage device can be accessed. This assumption is incorrect if the entire site that holds the source fails or is not accessible, for example after a natural disaster. In a second method, the source does not keep source_write_seq in any storage device. When the source restarts, it requests all replicas to send it their high sequence number, and the source picks the maximal received value of high as its source_write_seq. This method is applicable when the source hardware fails and the source is restarted on different hardware (e.g., a backup computer). It is assumed, however, that the set of replicas that the source communicates with after its recovery contains a replica that holds the correct highest write sequence number. If the source failure coincides with a network failure, there could be some replicas that did not receive the last write requests that the source sent before its own failure. If the source can communicate only with those replicas, the source will compute the wrong highest sequence number.

Several embodiments of the replica recovery process are described herein below. The recovery process handles new write requests that are sent from the source while the recovery is being performed. Since only write requests modify the data stored in the replicas, the recovery algorithm handles only write requests and, as previously discussed, the replica does not process read requests when it is not up-to-date. The recovery process performs what is designated as "delta recovery" in that only data items that were changed by write requests that were performed after the recovery replica's low counter are transferred from a current replica to the recovery replica. For example, if the recovery replica processed requests $write_1$, $write_2$ and $write_3$, while the current replica processed requests $write_1$, $write_2$, $write_3$, $write_4$ and $write_5$, then the current replica sends only the data items changed by $write_4$ and $write_5$. If $write_4$ and $write_5$ changed the same data item, it is sent only once.

Figure 8:
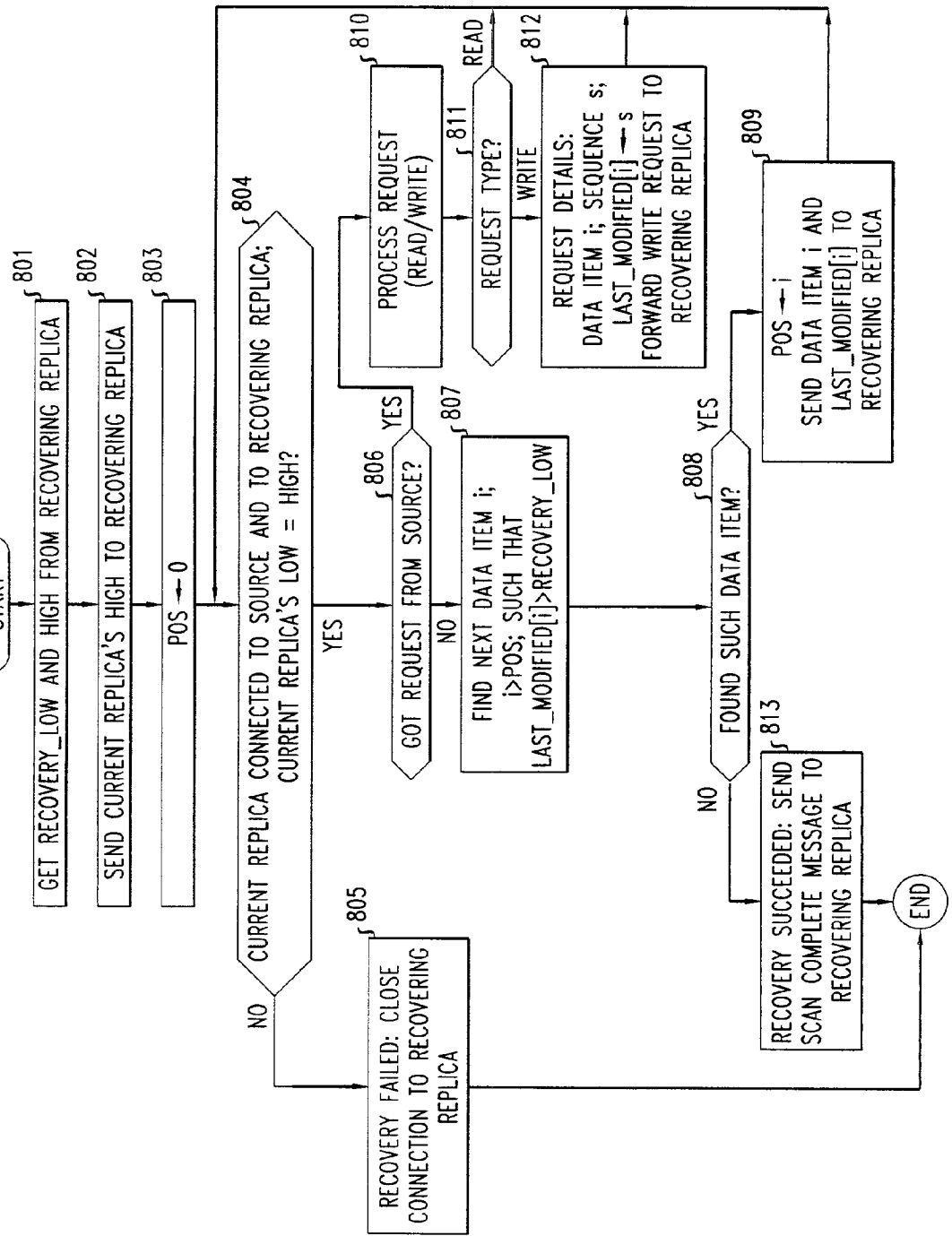
FIG. 8 is a flowchart that details the recovery process at a current replica in accordance with a first embodiment of the present invention.
Figure 9:
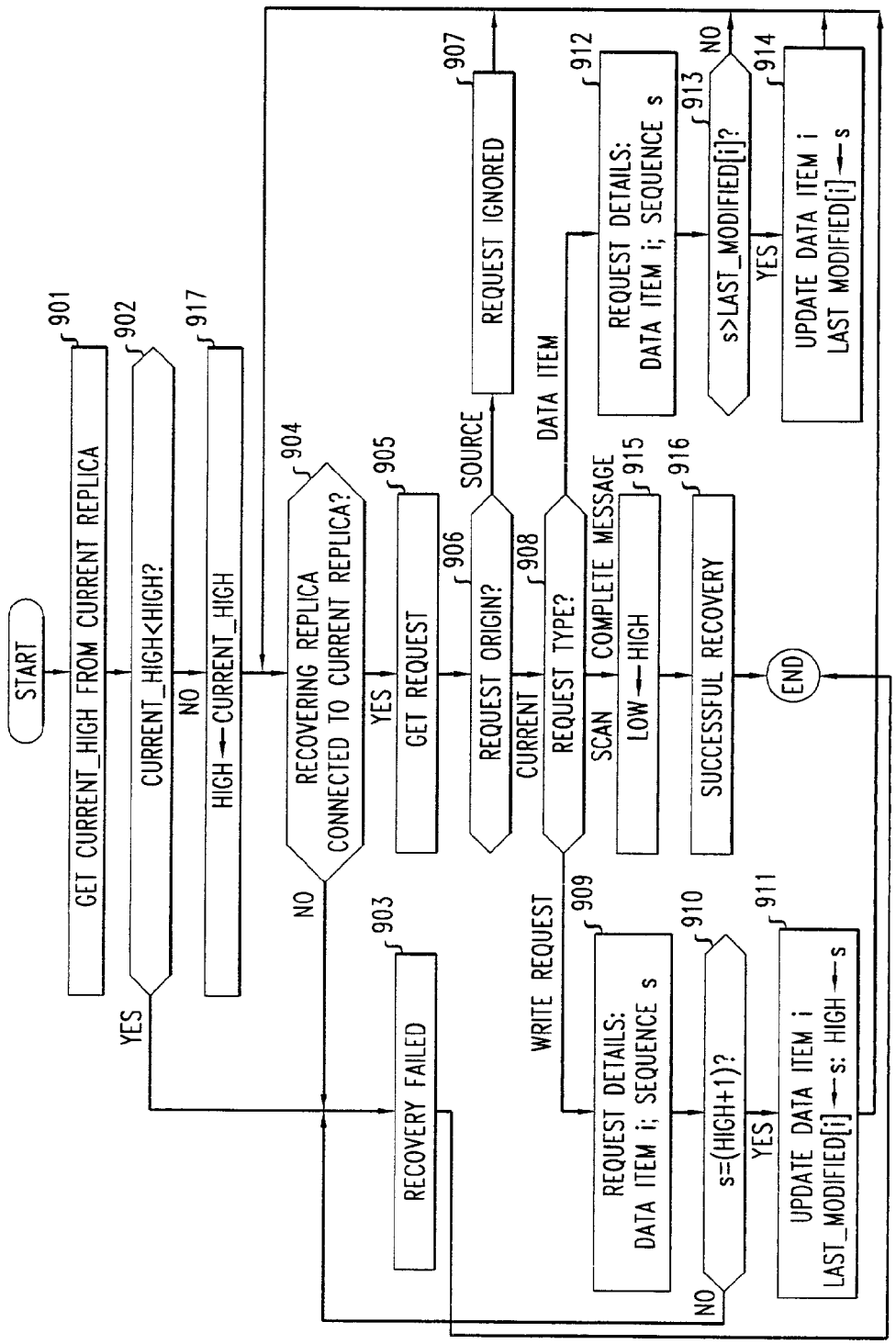
FIG. 9 is a flowchart that details the recovery process at the recovering replica in accordance with a first embodiment of the present invention.

FIGS. 8 and 9 show the operation of the recovery processes performed by the current replica and the recovering replica, respectively. The current and recovering replicas execute these processes concurrently. With reference to FIG. 8, at step 801, the current replica receives the low sequence from the recovering replica and stores that value, designated recovery_low, in a register 307 (in FIG. 3). This value is needed for sending the recovering replica only those data items that were changed after this sequence number. At step 802, the current replica's high sequence number is sent to the recovering replica, where its use will be described below in conjunction with the discussion of the process taking place at the recovering replica. Register 308 (see FIG. 3) stores a pos index count that is used to keep the position of the last data item that the current replica has sent the recovering replica. At step 803, pos is initialized to 0.

At step 804, a determination is made whether the current replica is connected to the source and the current replica's low equals its high, indicating that it is capable of receiving new requests from the source and that it is up-to-date. If no, at step 805, recovery has failed and the connection to the recovering replica is closed. If yes, then at step 806, a determination is made whether the current replica has gotten a request from the source. If it has not, then a sequential scan begins to send to the recovering replica those data items that were changed after the recovery replica's low, which is stored in recovery_low. Thus, at step 807, a search is made to find a data item i, with i greater than the current pos value such that the sequence number of the request that last modified that data item, last_modified[i], is greater than recovery_low. Thus, initially when pos is set to 0 at step 803, at step 807, the lowest numbered data item in which last_modified[i] is greater than recovery_low is determined. At step 808, a determination is made whether such a data item has been found. If yes, then, at step 809, pos is set to i, the position of the last found data item. That data item i and its associated sequence number, last_modified[i] are sent to the recovering replica. The process then returns to step 804.

If the current replica remains connected to the source and its low equals its high, and no new request has been received from the source, then, at step 807 again, the next data item is found such that its position i is greater than the newly set pos, the position of the last data item just sent to the recovering replica. Scanning of data items continues, item-by-item, until when, at step 806, a determination is made that a request has been received from the source. When that request is received, at step 810, the current replica immediately processes it locally. If at step 811, the request is determined to be a read request, it is not forwarded to the recovering replica and processing returns to step 804. If it is determined to be a write request, then, at step 812, the identity i and the sequence number s of the data item associated with the write request are determined. Last_modified[i] is then set to s and the write request is forwarded to the recovering replica before processing returns to step 804.

After processing a write request received from the source and passing that request on to the recovering replica, scanning of data items continues at step 807 with the next data item i that is greater than the last processed data item, pos, with last_modified[i] greater than recovery_low. Scanning continues until, at step 808, no such data item remains to be processed. At that point, at step 813, recovery has succeeded and a scan-complete-message is sent to the recovering replica.

The condition at step 806 ensures that the current replica processes requests from the source at a higher priority than scanning its data and sending it to the recovering replica. In this way, normal request processing of the current replica is not slowed down by the recovery. Otherwise, the current replica may eventually miss some requests from the source and may need to recover itself.

The current replica may terminate recovery in three conditions: the source closed the connection, the recovering replica closed the connection, or the current replica is no longer up-to-date. All these conditions may happen during the recovery period. The recovering replica may decide to fail the recovery (to be discussed below), the recovering replica itself may fail, the network may fail, or the current replica itself may become not up-to-date due to other failures in the system.

The operation of the recovering replica is more involved, since the recovering replica has to combine the information is received from the current replica with its own data items. With reference to FIG. 9, the recovering replica begins by receiving, at step 901, the current replica's high counter into current_high. At step 902, current_high is compared with the recovering replica's own high count. This is critical, since the recovering replica may have a gap. For example, it received write requests numbers 1, 2, 3 and 6, while the current replica received only write requests 1, 2, 3 and 4. This may occur when there is a network delay between the source and the current replica. The current replica is still up-to-date, and it will eventually catch up and receive the missing write requests. However, if the current replica performs the recovery with its present state, the recovering replica will still miss write request number 5. Thus, if, at step 902, current_high is less than the recovering replica's high count, then the recovery is failed at step 903. In that case the recovering replica will try to recover again. The current replica should eventually catch up with the recovering replica, since the recovering replica stops processing new write requests from the source while it tries to establish the connection with the current replica.

If current_high is not less than the recovering replica's high count, then, at step 917, the recovering replica sets its high counter to the current replica's high, current_high, which is safe to do since the recovering replica will get all updates to and including current_high by the end of the recovery period.

At step 904, a determination is made whether the recovering replica is connected to the current replica. If not, recovery is failed at step 903. If yes, then, at step 905, the recovering replica gets a request. At step 906, a determination is made whether the origin of that request is from the current replica or from the source. If the origin of the request is directly from the source, then, at step 907, the request is ignored since, as previously discussed, all new write requests are received by the recovering replica only through the current replica. If the origin of the request is the current replica, then, at step 908, the type of the request is determined. The request can be a write request, which must arrive without a gap, a data item, or a scan-complete-message.

Write requests are applied in the order they are received. These are new write requests that were processed by the current replica and forwarded to the recovering replica. They are guaranteed to be more recent than the data items they replace since the current replica's high was greater than or equal to the recovering replica's high at the beginning of the recovery process. If the request type is a write request, then, at step 909, the details of the request are determined, specifically the particular data item i that is modified by the request s and its sequence number s. At step 910, a determination is made whether s is equal to high+1. If the request is the first write request received from the current replica in the recovery process, it should properly have a sequence number that directly follows the previous high count of the current replica, since it was set at step 917 to current_high. Alternately, this request must follow a previous request sent by the current replica. If, at step 910, s doesn't equal high+1, then the current replica is not up-to-date and the recovery is failed at step 903. If s is equal to high+1, then, at step 911, data item i is updated to its new value as specified by the write request, last_modified[i] is set to s, and high is set to s. Thus, the next time a write request is received from the current replica, at step 910, it should have a sequence number that is 1 greater than the newly set high.

If, at step 908, the request type is a data item from a sequential scan of data items at the current replica, then the recovering replica must verify that the data item it receives from this scan is indeed more recent than the data item it currently has, since that data item may have already been updated by a more recent write request that was sent from the current replica. At step 912, details of that data item are determined, specifically the identity i of that data item and its sequence number s. At step 913, a determination is made whether the sequence number s of this received data item is larger than the sequence number already stored in the recovering replica's last_modified vector for this data item, last_modified[i]. If s is not greater, then recovering replica already has a more recent vallue of that data item, so this data item is ignored. On the other hand, if s is greater than last_modified[i], then the scan contains the most recent value of that data item. At step 914, therefore, that data item i is updated with its new value and last_modified[i] is set to the sequence number s associated with that value.

The recovering replica should not accept writes from the source while doing a recovery to avoid the creation of new gaps. For example, the recovering replica may initially receive write requests 1, 2 and 3 and the current replica receives request 1, 2, 3, 4 and 5. If there is a big delay in the communication between the source and the current replica, write requests 6 and 7 may be on their way to the current replica, while the source sends write request 8 to the recovering replica. If the current replica is quick, it may complete the recovery before receiving requests 6 and 7 from the source. However, the recovering replica already received request 8, which creates a new gap.

In order to avoid race conditions on access to the last_modified vector, the current replica must not scan the data items and modify them at the same time. In other words, the current replica may either scan the data items or apply write requests, but not both at the same time. This is shown in FIG. 8, in which the current replica either processes requests received from the source, or scans its last_modified vector.

If the request type, at step 908, is determined to be a scan-complete-message, then all data items have been scanned and forwarded to the recovering replica. At step 915, low is set to high, and, at step 916, recovery is complete and successful.

An example of the recovery process at the current replica and at the recovering replica is described in conjunction with the examples shown in the tables of FIGS. 10 and 11. The table in FIG. 10 illustrates a sequence of write requests that are sent by the source and the contents of the data items after applying each request in turn. Each replica keeps three data items numbered 1 to 3. This table shows how the contents of these data items change as the requests are processed, assuming normal operation and no request is lost. Initially, the content of each data item is undefined and the last_modified vector contains 0's in each element. The sequence of seven write requests progressively modifies the data items. Write request 1 (sequence number 1) changes data item 1 to the value A and last_modified[1] is set to sequence number 1. Data item 1 is never rewritten by the following six requests so that its value remains A and its associated last_modified[1] remains 1. On the other hand, data item 2 is initially set by request 2 to value B and its last_modified[2] then set to 2. However, it is modified by request 4, and finally by request 7 to the value G. Thus, last_modified[2] changes from 2 to 4, and finally to 7. Data item 3 is similarly modified multiple times.

The table in FIG. 11 illustrates the recovery operation after the recovering replica (R) has received requests 1–3, inclusive, and the current replica (C) has received requests 1–5, inclusive. The table shows the initial values of data items 1–3, the associated last_modified vector and the low and high counters in the recovering replica R, and the initial values of data items 1–3 the associated last_modified vector, the low and high counters, and the pos counter in the current replica C. In the table and in the following text, S refers to the source. The situation illustrated could have arisen if the recovering replica disconnected from the source and then reconnected. After reconnection, the source discovered that the reconnected replica missed a few requests and needed to recover from the current replica. Specifically, upon reconnecting to the source, R sends its high and low counters to S, which sends a response that R needs to recover. Although R did not have a gap since high=low=3, it has lost requests that the other replica had received due to the disconnection. Thus, upon reconnection S's source_write_request is greater than the R's high counter and thus S knows that R needs to recover.

When recovery starts, R has low=high=3, and C has low=high=5. These initial values correspond to the data contents after processing the third and fifth requests, respectively, in FIG. 10. R then sends low=3 to C, saying it missed everything after the third request and needs request 4 and higher. C then sends high=5 to R because from hereon forward during the recovery period, C will forward write requests from S to R, and those write requests will have a sequence number starting at high+1 of C. Because R has a high counter which is less than the high counter of C, R changes its high counter to this number 5, so that R will not detect a gap when it gets the next forwarded request from C. This is done to prepare R for properly processing a forwarded request from C. In FIG. 9, the recovering replica starts by getting the current replica's high. It verifies that the high value of the current replica is indeed larger than its own high counter. If, in the example in FIG. 11, R had a high=6, then it would have received one more request than C, with a gap in the middle, which caused it to recover. There would then be a potential for an incomplete recovery, which needs to be avoided. Thus, recovery does not proceed in the situation where current_high is less than R's high.

Returning to the example in FIG. 11, after R changes its high to 5, C receives write$_6$ from S, thereby updating data item 3 to value F, last_modified[3] to 6 and C's high and low counters to 6. C then forwards write$_6$ to R, thereby updating its data item 3 to value F, its last_modified[3] to 6, and its high counter to 6. R's low counter, however, remains at 3, since there is still a gap. Scanning of data items at the current replica then begins. C first sends data item 2 to R because its last_modified[2], equal to 4, is higher than R's low, equal to 3. The pos counter at C is then set to 2, so that scanning will recommence after item 2. At R, data item 2 is updated to the value D and its last_modified[2] is changed to 4. C then gets write$_7$ from S, and changes data item 2 to the value G, last_modified[2] to 7, and its low and high counters to 7. C then sends write$_7$ to R, where data item 2 is changed to the value G, last_modified[2] to 7, and the high to 7. Scanning now continues, beginning where the previous scan ended and continuing forward. Thus C next sends data item 3 to R, since its last_modified[3], equal to 6, is higher than R's low, which is equal to 3. C then updates its pos counter to 3. Since the value of last_modified[3] at R is also 6, R ignores this update to data item 3, since it never overwrites data with other data which has a lower or equal sequence number. C now finds that it does not have any further data items to scan which have a last_modified element that is higher than recovery_low. It then sends a scan-complete-message to R, telling it that the data scan is complete. R then sets its low counter to the value of its high counter to indicate that no data is missing. Recovery is then complete.

A second embodiment of the recovery process reduces the number of data items sent by the sequential scan by eliminating the transfer of data items that were previously modified by a write request that have already been forwarded from the current replica to the recovering replica. In other words, the corresponding data item in the recovering replica already has the most recent value and its associated last_modified element contains the correct sequence number.

In the second embodiment, the current replica, and thus each replica in the system, includes an additional counter 309 (in FIG. 3) that stores a count start_high, which is the value of the current replica's high counter when recovery starts. During the sequential scan, the current replica forwards a data item to the recovering replica only if it was modified more recently than the recovering replica's low but before or at start_high. Since all of the write requests that the current replica performs and forwards to the recovering replica have a sequence number higher than start_high, this condition ensures that the sequential scan does not send any data item that was previously modified by a write request which was already forwarded.

Figure 12:
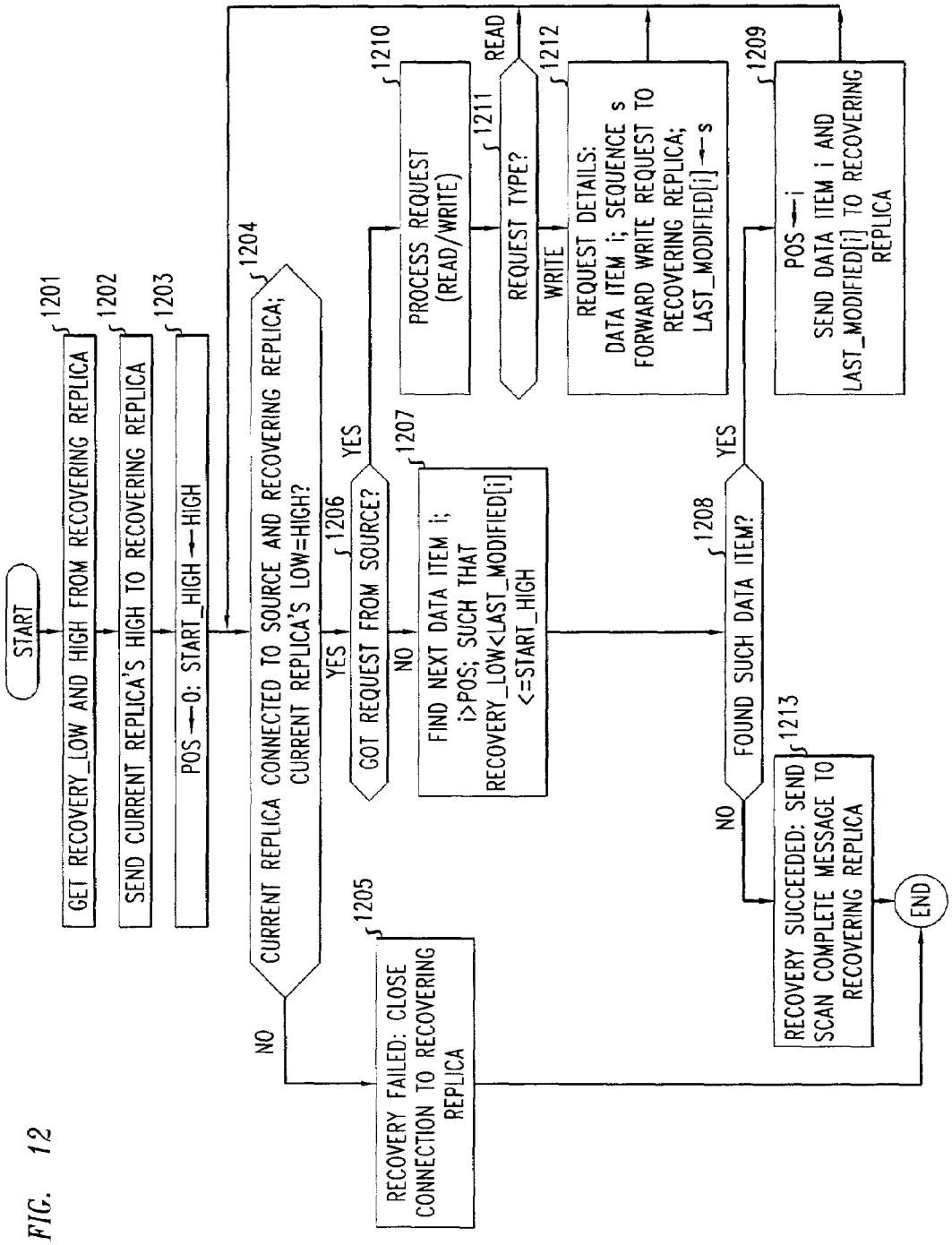
FIG. 12 is a flowchart that details the recovery process at the recovering replica in accordance with a second embodiment of the present invention, which eliminates the transfer of data items from the current replica that were previously sent to the recovering replica.

FIG. 12 depicts the operation of this embodiment of the recovery process in the current replica. Steps 1201–1213 correspond one-by-one to the steps 801–813, respectively, in FIG. 8 described above. Each individual common step will therefore not be described in detail since the similarity between the processes in FIGS. 8 and 12 is readily apparent to one skilled in the art. The steps that are different are described as follows. At step 1203, start_high is initialized by setting it to the current replica's high value. Then, during the sequential scan of data items, at step 1207, a test is made on each data item i to determine that the sequence number associated with the last update of that data item, last_modified[i], is both higher than the recovering replica's low, recovery_low and less than or equal to start_high. This prevents the sending of a data item that has been modified by a previously forwarded write request. On the recovering replica side, the process remains the same as that at the recovering replica in the first embodiment that was previously discussed in association with FIG. 9.

In the first and second embodiments described above, the last_modified vector needs to be maintained in a non-volatile storage device, such as non-volatile memory or a disk. If the system is intended to handle a high load of requests, the last_modified vector should preferably be kept in a non-volatile memory such as NVRAM, since this vector is accessed frequently during recovery. This is especially true when the data items are stored on a hard disk since the access to the last_modified vector determines whether the disk access should or should not be performed. NVRAM is expensive, costing much more than a regular memory of the same size. Cost becomes a major issue since the first and second embodiments require one last_modified vector element for each data item.

Figure 13:
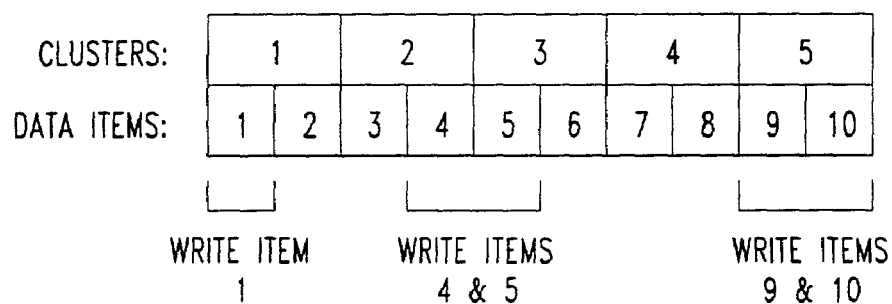
FIG. 13 shows data items grouped into clusters.

In a third embodiment, the M data items are divided into clusters in which every data item belongs to one and only one cluster. Preferably, the M data items are divided into $\lceil M/k \rceil$ equal-sized (to make it simpler) non-overlapping clusters of k elements each, where the symbol $\lceil z \rceil$ means the smallest integer that is larger than the the value of z. As an example, FIG. 13 depicts the mapping of 10 data items into 5 clusters of two data items each. This figure also depicts the mapping of write requests to clusters. A write request may modify a portion of a cluster, such as write to data item 1. Some requests may modify several clusters, such as the request to write data items 4 and 5. Some write requests may modify a whole cluster, such as the request to write data items 9 and 10. The descriptions of the first and second embodiments above have shown how to handle requests that access a single data item. A discussion is included herein below that explains how the recovery operations can be modified to handle requests that access several data items. Before that discussion, however, the third and fourth embodiment of the recovery procedures will be described.

Figure 14:
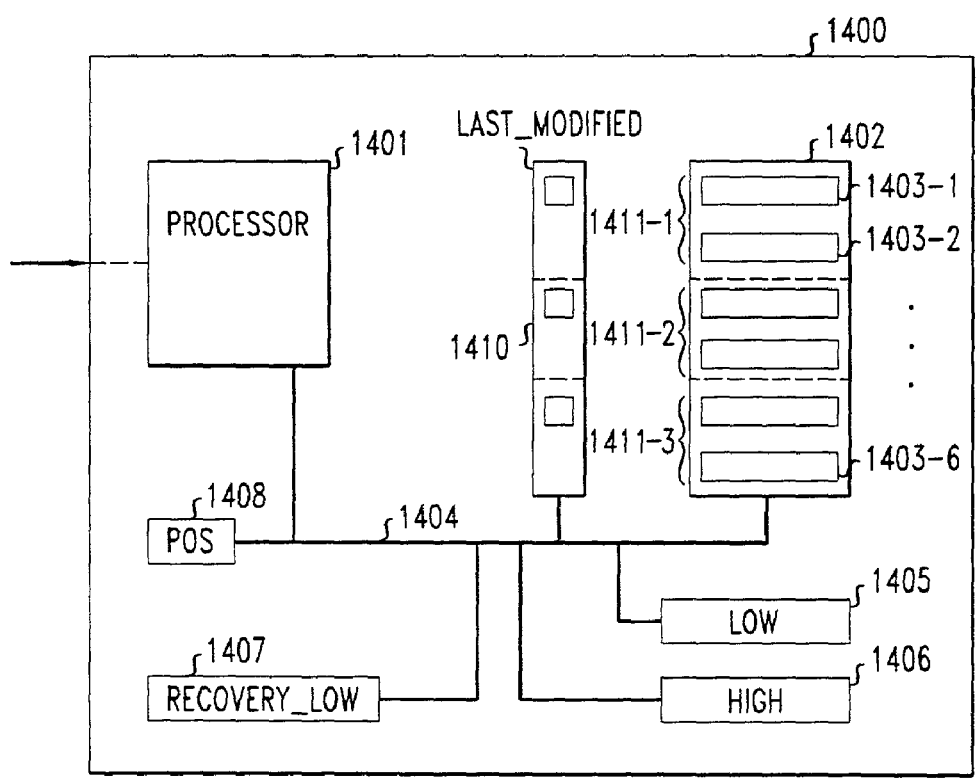
FIG. 14 is a block diagram of a replica in accordance with a third embodiment of the present invention in which data items are grouped into clusters.

In the third embodiment, as noted above, the M data items are mapped into clusters. The recovery processes are similar to those described above for the first and second embodiments. The current and recovering replicas, however, maintain an entry in the last_modified vector for each cluster of data items rather than for each data item. FIG. 14 is a block diagram of a replica in accordance with the third embodiment, which is similar to the replica in FIG. 3. Replica 1400 includes processor 1401, non-volatile storage device 1402, bus 1404, low and high registers 1405 and 1406, respectively, pos register 1408, and a non-volatile storage device 1410 containing the last_modified vector. Non-volatile data storage device 1402 is shown containing six storage locations 1403-1–1403-6 for six data items. There are two data items in each of three clusters, 1411-1–1411-3. There are three storage locations in storage device 1410, one for each of the three elements of the last_modified vector, each element being associated with one of the clusters identified by the numeral c. Each element of the last_modified vector, last_modified[c], contains the sequence number of the latest write request that modified any of the data items in the cluster c. Thus, in the example shown in FIG. 7 in which each cluster contains two data items, the last_modified element for each cluster c contains the sequence number of the latest write request that modified either of the two data items in its associated cluster. Also, in accordance with this embodiment, clusters of data items are transferred from the current replica to the recovering replica during the data scan rather than single data items.

Figure 15:
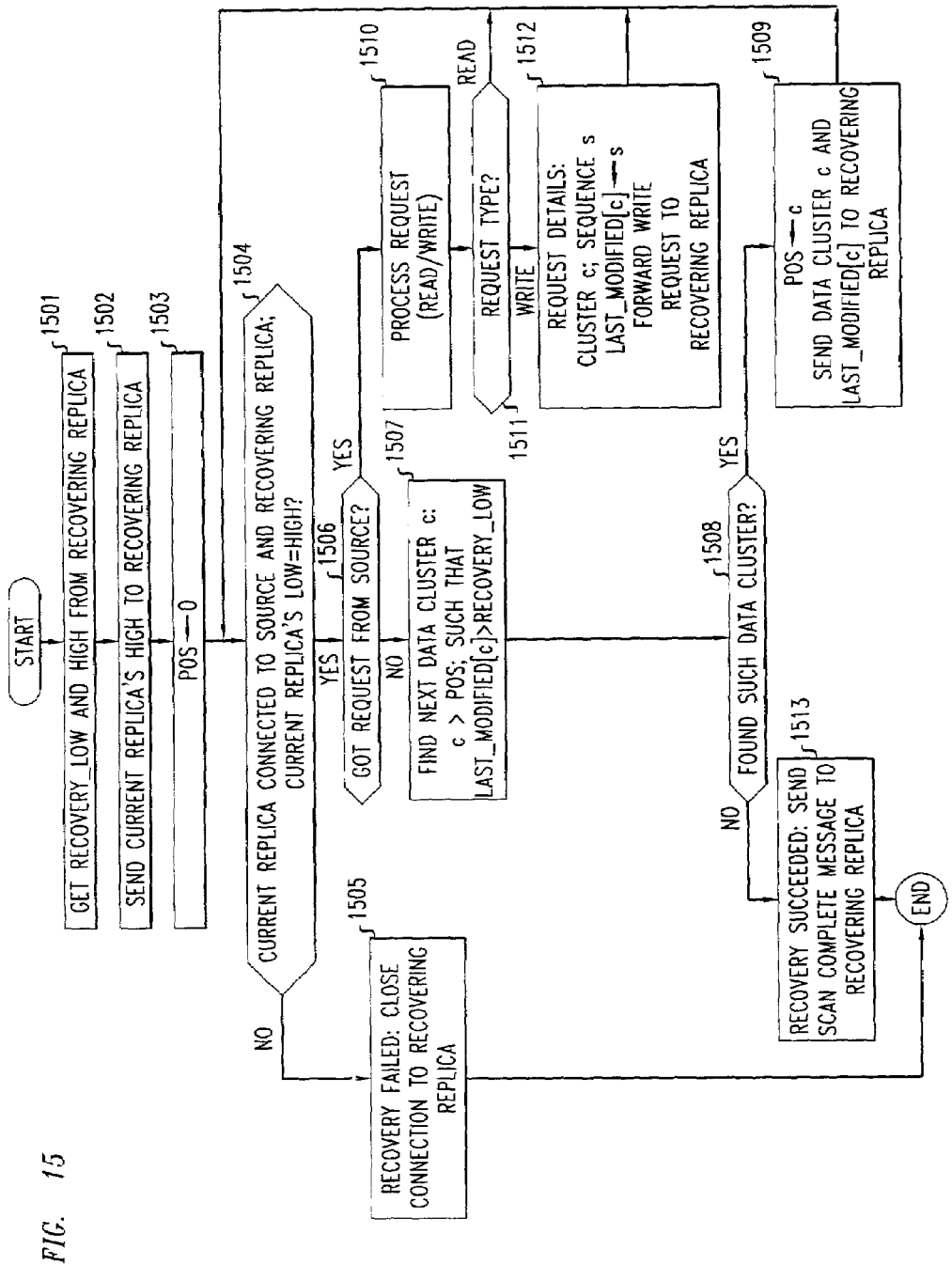
FIG. 15 is a flowchart that details the recovery process at the current replica in accordance with the third embodiment of the present invention.

FIG. 15 shows the recovery process at the current replica for this third, clustered, embodiment. Each of the steps in FIG. 15, 1501–1513, parallels a corresponding step, 801–813, respectively, in the recovery process at the current replica in the first embodiment previously described. As noted above, however, the entries for the last_modified vector contain the sequence number of the last write request that modified any data item in the corresponding cluster, and data scanning sends clusters and not data items to the recovering replica. Thus, the pos counter used for scanning represents the identity of the cluster in data storage 1402 being scanned rather than the identity of a data item being scanned.

The steps in FIG. 15 that differ from the corresponding steps in FIG. 8 are described as follows. When a request for a data item is received from the source, at step 1506, and is determined, at step 1511, to be a write request, the details of that request are determined at step 1512. Specifically, the cluster c to which the data item belongs is determined as well as the sequence number s of that request. The element last_modified[c] is then set to s since the write request has modified a data item within cluster c. The write request is then forwarded to the recovering replica. During the data scan, clusters and not individual data items are sent to the recovering replica. Thus, at step 1507, a cluster is found whose position c is greater than the pos count such that last_modified[c] is higher than the recovering replica's low count, recovery_low. If, at step 1508, such a data cluster is found, then, at step 1509, pos is set to c and the entire data cluster c and last_modified[c] are sent to the recovering replica.

Figure 16:
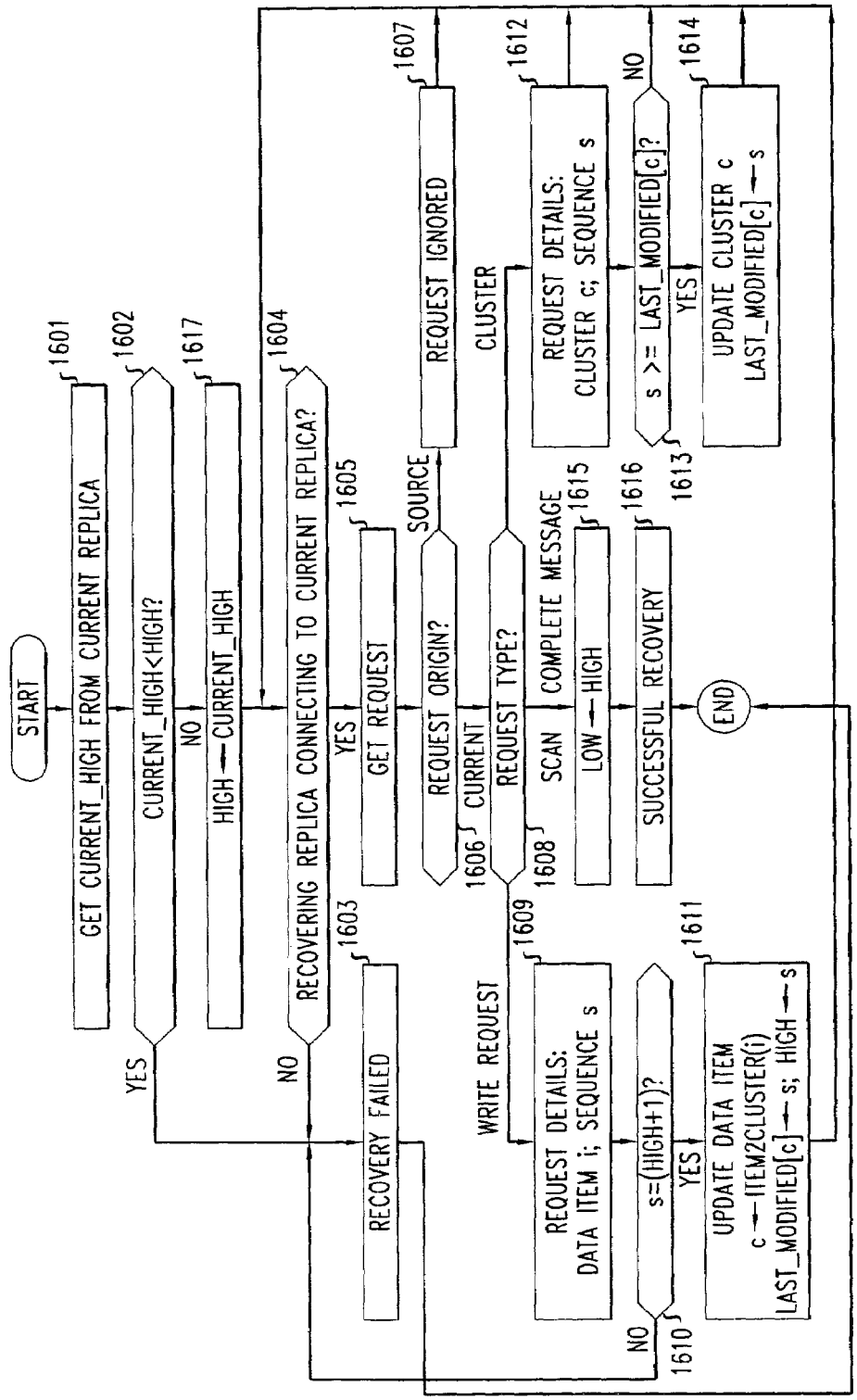
FIG. 16 is a flowchart that details the recovery process at the recovering replica in accordance with the third embodiment of the present invention.

FIG. 16 shows the recovery process of the recovering replica during the recovery period for this third, clustered, embodiment. Each of the steps 1601–1617 corresponds, one-by-one, with the steps 901–917, respectively, in FIG. 9, which, as described above, shows the recovery process of the recovering replica for the first embodiment. The overall process and each of the steps in FIG. 16 is essentially the same as the process and corresponding steps in FIG. 9. Again, only those step of the recovery process that relate specifically to the clustered recovery process shown in FIG. 16 are discussed as follows. Firstly, as noted, the last_modified vector contains entries that relate to clusters and not to data items. The steps 1605–1610 are identical to steps 905–910 in FIG. 9. At step 1611, as in step 911, data item i is updated. Since, however, the last_modified vector has entries for clusters and not for data items, a function is needed to determine in which cluster number a given data item belongs. The function item2cluster(.) is used to compute the cluster number of a given data item. Thus, at step 1611, the cluster identifier c is set to item2cluster(i), the cluster from which item i originated, last_modified[c] is set to s, and the high counter is set to s..

If the request type received from the current replica is determined, at step 1608, to be a cluster, then, at step 1612, the details of that cluster are determined, specifically, the identification the cluster c and its sequence number s. The sequence number s of the cluster is the highest sequence number associated with any element in that cluster, which is equivalent to the last_modified element of that cluster from the standpoint of the current replica. At step 1613, a determination is made whether s is greater than or equal to last_modified[c] of the corresponding cluster c stored at the recovering replica. If it is, then cluster c is updated to the values in the received cluster and last_modified[c] is set to s.

It should be noted that unlike the embodiment in FIG. 9 in which, at step 914, a data item is updated only if the sequence number of the received data item is greater than the last_modified[i] stored by the recovering replica, in the clustered recovery process, the contents of the cluster at the recovering replica are replaced by the received cluster even if the received cluster has the same sequence number. This is done to avoid the potential for data corruption as described below.

Figures 17, 18:
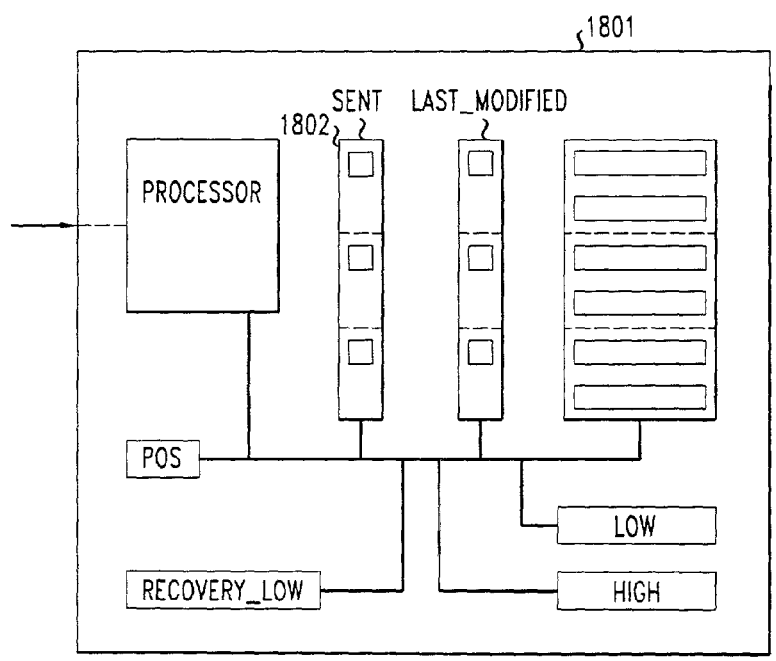
FIG. 17 is a table showing how data can be corrupted by an incorrect clustered recovery.
FIG. 18 is a block diagram of a replica in accordance with a fourth embodiment of the present invention in which clusters are sent at most once during the recovery process.

The table in FIG. 17 depicts a situation in which data corruption could occur. Herein and in this table, C represents the current replica, R the recovering replica, and S the source. For this example, for simplicity, it is assumed that there are only two data items and one cluster. Initially it is assumed that R has received all requests up to and including request $write_5$ and C has received all requests up to and including request $write_{10}$. If the next request to C is $write_{11}$ to a single item in the cluster, i.e., to change data item 2 to a value E, then C changes the value of the second data item to E and changes the value of last_modified to 11. C then forwards $write_{11}$ to R, which, upon receiving it, changes the value of the second data item to E and last_modified to 11. As part of a scan, C sends this cluster 1 to R with last_modified equal to 11. If R would require the received cluster to have a higher sequence number than its last_modified value before it replaces the cluster, then R will ignore this cluster. As a result, the stale value, A, of the first data item remains in the recovering replica and not the value C, which is the correct most current value in the current replica. This situation is avoided by allowing a new cluster received from C during a scan to overwrite an existing cluster in R even if C's new cluster has the same last_modified value as that cluster's last_modified value in R. Thus, in the table, R would accept the cluster in which the first data item has a value C and the second data item a value E, thereby ensuring consistency between the recovering and current replicas.

For a correct implementation of the clustered recovery process, two requirements should be met. The first requirement is that the current replica should send the clusters and forwarded requests to the recovering replica using the same communication channel in order to maintain the temporal relationship between the clusters and the write requests. This prevents data corruption when the current replica sends a cluster to the recovering replica on one communication channel, and then forwards a write request that modifies a data element in the same cluster on a second channel. The sequence number of the write request is higher than the last_modified value of the cluster, since the cluster was sent first. However, if the write request is received first by the recovering replica, then the recovering replica will ignore the cluster, since its sequence number is now less than the recovering replica's last_modified value. The second requirement that should be met is that the current replica should not scan the clusters and modify them at the same time in order to avoid race conditions on access to the last_modified vector. In other words, the current replica may either scan the clusters or apply request, but not both at the same time.

As previously noted, the clustered recovery process has advantages over the first two embodiments described above. Firstly, the amount of required non-volatile memory is reduced by allocating an element in the last_modified vector for a cluster and not for every data item. Secondly, the storage device access overhead is reduced by reading and writing clusters. On the negative side, however, the clustered recovery process may in fact transfer more data than the second embodiment described above since not all of the data items in a particular cluster have to be transferred.

A fourth embodiment of the recovery process improves upon the above-described third embodiment by reducing the amount of data sent from the current replica to the recovering replica. In accordance with the fourth embodiment of the recovery process, every cluster is sent at most once during the recovery period. If a cluster has already been sent by either the data scan or by forwarding the request, the cluster is not sent again during the recovery period. An additional vector, the sent vector, is maintained in the current replica (and thus in each replica) that indicates whether each cluster was or was not already sent. The replica 1801 in FIG. 18 is similar to the replica in FIG. 14 with the addition of data storage 1802 for the sent vector, which has an element associated with each cluster that contains a flag indicating whether the associated cluster was sent. The sent vector contains [M/k] elements, one for each cluster. The sent vector may be stored in volatile memory, such as RAM, since it can be recomputed after a replica failure. Further, in this fourth embodiment, when a write request to a cluster that has not been sent already to the recovering replica is received, the current replica sends the entire cluster to the recovering replica and does not just forward the write request. If the cluster was already sent, the current replica forwards just the write request.

Figure 19:
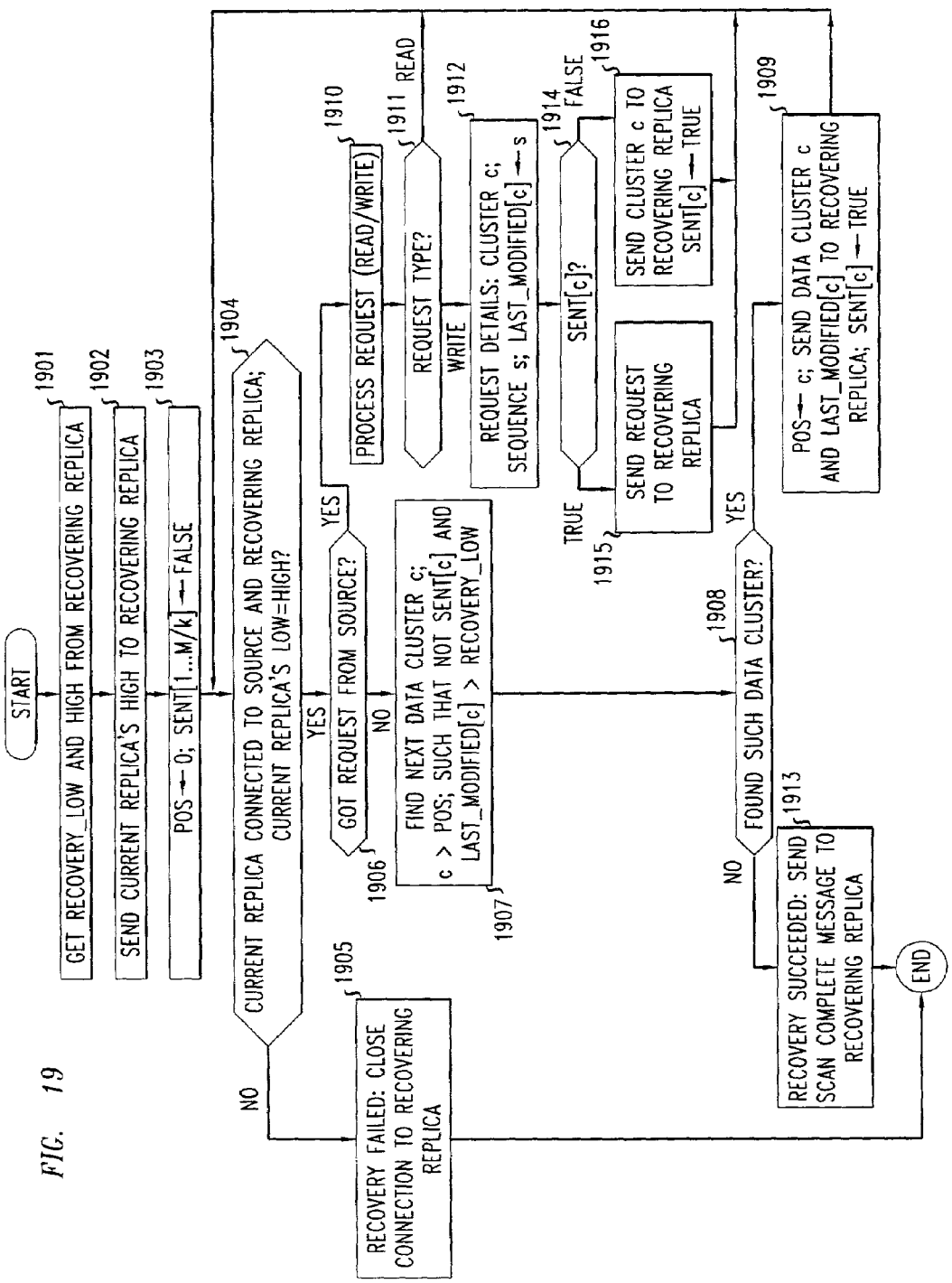
FIG. 19 is a flowchart that details the recovery process at the recovering replica in accordance with the fourth embodiment.

The scenario depicted in the table in FIG. 17 is avoided by sending the whole cluster when the first write request to any of the data items in a cluster is received. In this way, the recovering replica receives the correct contents of the entire cluster, including other data items which were changed before and missed by the recovering replica. For this embodiment, the recovery process at the recovering replica is the same as that for the clustered embodiment as shown in FIG. 16. The recovery process at the current replica is shown in FIG. 19, and is similar to the recovery process for the current replica shown in FIG. 15 for the clustered embodiment. Steps 1901–1912 parallel steps 1501–1512, respectively, in FIG. 15. The differences are described as follows. At step 1903, after the current replica's high has been sent, at step 1902, to the recovering replica, the current replica sets its pos count to 0 and sets every element of the sent vector to FALSE. The scanning of clusters, at step 1907, finds the next data cluster c for which c is greater than the pos count, which was not sent (sent[c]=FALSE), and for which last_modified[c] is higher than the recovering replica's low count, recovery_low. If such a cluster is found, then, at step 1909, pos is set to c, cluster c and last_modified[c] are sent to the recovering replica, and sent[c] is set to TRUE. By setting sent[] to TRUE, that cluster c is then precluded from being sent to the recovering replica again during the current recovery period. If, at step 1907, a cluster is determined during the data scan to have been sent (sent [c]=TRUE), it must have been sent to the recovering replica in response to a write request, so it is not sent again during the scan.

When the current replica gets a request from the source (step 1906), scanning stops and the current replica processes the request (at step 1910). If the request is a write request (step 1911), at step 1912, the request details are determined, specifically, the cluster c to which the request pertains and the sequence s of the request. Also at this step, last_modified[c] is set to s. Then, at step 1914, a determination is made whether or not this cluster has previously been sent (during the scan or by a previous write request) based on the value of sent[c]. If sent[c] is TRUE, then, at step 1915, only the individual write request to the data item is sent to the recovering replica. If sent[c] is determined to be FALSE, then, at step 1916, the entire cluster c is sent to the recovering replica and sent[c] is set to TRUE to prevent that cluster from being sent again to the recovering replica during the current recovery period.

Although the read and write requests have been assumed in above-described embodiments to access a single data item, in fact the read and write requests may access several data items. This invention is therefore intended to include the access by read and write requests of multiple data items, which in the case of the clustered embodiments may span more than one cluster. In the claims, therefore, a request is intended to include the access of both single data items as well as multiple data items. Requests that access several consecutive data items are common when the data items are stored on a disk, and the source generates requests which are derived from SCSI read and write requests to the data.

Each of the above-described recovery processes can handle multi-item requests by modifying the corresponding data items and updating the last_modified and sent vectors in an atomic operation. For example, if the request is to write three consecutive data items, all data items and the last_modified vector, will be modified before the next operation starts. For example, FIG. 4 shows the processing of a request that refers to a single data item. The same process can be used to process requests that refer to multiple data items. The only changes would be to step 406 which modifies data item i and sets last_modified[i] to s, and to step 413, which reads data item i. In all cases, the process simply performs the request operation on all of the requested data items instead of a single data item.

Although the above-described embodiments use sequence numbers to determine which data items have been more recently updated than others, to determine whether a data item has been updated by a more recent write request than a given write request, to detect when a replica is not up-to-date, and to determine which write requests have been missed, other methods could be devised by those skilled in the art without departing from the spirit and scope of the invention. The foregoing, therefore, merely illustrates the principles of the invention. It will thus be appreciated that those skilled in the art will be able to devise various other arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

The invention claimed is:

1. In a replicated data storage system in which a source sends read and write requests to a plurality of replicas, each replica comprising a storage device that stores a plurality of data items, each replica storing the same data items, each write request being associated with a write sequence number consecutively assigned by the source, a method for achieving consistency between a recovering replica that has been determined to be not up-to-date and one of the replicas that is current as a result of a failure in the system that has caused the recovering replica to miss receiving at least one write request that updates at least one data item, the method at the recovering replica comprising:

ignoring all new read and write requests directly received from the source during a recovery period in which the recovering replica recovers from a specified current replica;

if the source sends a new write request during the recovery period, then replacing a stored value of a data item and its associated write sequence number with an updated value of the data item and its associated write sequence number in response to the new write request that is forwarded to the recovering replica by the current replica, the write sequence number associated with the updated value of the data item being the write sequence number of the write request that last modified that data item;

receiving from the current replica at least the data items that were updated by write requests that were missed by the recovering replica, each data item being received with its associated write sequence number, the write sequence number associated with a data item received from the current replica being the write sequence number of the write request that last modified that data item at the current replica; and replacing a value of at least one data item and its associated write sequence number that are stored by the recovering replica with a value of the received current replica's corresponding data item and its associated write sequence number, respectively, only if the write sequence number associated with the data item received from the current replica is higher than the recovering replica' stored write sequence number of the corresponding data item.

2. The method of claim 1 wherein the data items and their associated write sequence numbers are stored by the recovering replica in at least one non-volatile storage device.

3. The method of claim 1 wherein a write request updates one or more data items, the write sequence number associated with the one or more data items being the write sequence number of the write request.

4. In a replicated data storage system in which a source sends read and write requests to a plurality of replicas, each replica comprising a storage device that stores a plurality of data items, each replica storing the same data items, each write request being associated with a write sequence number consecutively assigned by the source, a method for achieving consistency between a recovering replica that has been determined to be not up-to-date and one of the replicas that is current as a result of a failure in the system that has caused the recovering replica to miss receiving at least one write request that updates at least one data item, the method at a current replica that has been specified to the recovering replica to recover from comprising:
  receiving from the recovering replica a low count that is the highest write sequence number for which all consecutive write requests from the source up to a request with a write sequence number equal to this low count have been received and processed by the recovering replica;
  if, during a recovery period in which the recovering replica recovers from the specified current replica, a write request is received from the source that updates a value of at least one data item, the write request having an associated write sequence number, then
    updating a stored value of the data item and a stored associated write sequence number with the received updated value of the data item and its associated write sequence number, respectively, the write sequence number associated with the updated value of the data item being the write sequence number of the write request that last modified this data item at the recovering replica;
    forwarding the write request with its associated write sequence number to the recovering replica; and
  scanning data items stored by the current replica and sending to the recovering replica during the recovery period the value of each stored data item and its associated stored write sequence number if the write sequence number associated with the stored data item is higher than the low count received from the recovering replica.

5. The method of claim 4 wherein if a write request that updates the value of a particular data item is received from the source and is forwarded to the recovering replica, then a stored value of that particular data item and its associated write sequence number are not sent to the recovering replica while scanning and sending stored data items even if the write sequence number associated with that particular stored data item is higher than the low count.

6. The method of claim 4 wherein the last-modified data items, their associated write sequence numbers, and the low count are stored in at least one non-volatile storage device.

7. The method of claim 4 wherein a write request updates one or more data items, the write sequence number associated with the one or more data items being the write sequence number of the write request.

8. In a replicated data storage system in which a source sends read and write requests to a plurality of replicas, each replica comprising a storage device that stores a plurality of data items, each replica storing the same data items, each write request being associated with a write sequence number consecutively assigned by the source, a method for achieving consistency between a recovering replica that has been determined to be not up-to-date and one of the replicas that is current as a result of a failure in the system that has caused the recovering replica to miss receiving at least one write request that updates at least one data item, the method at the recovering replica comprising:
  ignoring all requests directly received from the source during a recovery period in which the recovering replica recovers from a specified current replica;
  if the source sends a new write request to a data item during the recovery period, each data item belonging to a cluster of one or more data items and each cluster having an associated cluster sequence number that is equal to a write sequence number of a write request that last modified any of the data items in the cluster, then replacing a stored value of the data item and the cluster sequence number of the cluster containing the data item with an updated value of the data item and its associated write sequence number, respectively, in response to the new write request that is forwarded to the recovering replica by the current replica;
  receiving from the current replica at least the clusters containing the data items that were updated by write requests that were missed by the recovering replica, each cluster being received with its associated cluster sequence number, the cluster sequence number associated with a cluster received from the current replica being the write sequence number of the write request that last modified any data item in that cluster at the current replica; and
  replacing values of the data items in at least one cluster and its associated cluster sequence number that are stored by the recovering replica with values of the data items in the received current replica's corresponding cluster and its associated cluster sequence number, respectively, only if the cluster sequence number associated with the cluster received from the current replica is higher than or equal to the recovering replica's stored cluster sequence number of the corresponding cluster.

9. The method of claim 8 wherein the data items and their cluster sequence numbers are stored by the recovering replica in at least one non-volatile storage device.

10. The method of claim 8 wherein a write request updates one or more data items, the write sequence number associated with the one or more data items being the write sequence number of the write request.

11. In a replicated data storage system in which a source sends read and write requests to a plurality of replicas, each replica comprising a storage device that stores a plurality of data items, each replica storing the same data items, each write request being associated with a write sequence number consecutively assigned by the source, a method for achieving consistency between a recovering replica that has been determined to be not up-to-date and one of the replicas that is current as a result of a failure in the system that has caused the recovering replica to miss receiving at least one write request that updates at least one data item, the method at a current replica that has been specified to the recovering replica to recover from comprising:

receiving from the recovering replica a low count that is the highest write sequence number for which all consecutive write requests from the source up to the request a write sequence number equal to this low count have been received and processed by the recovering replica; if, during a recovery period in which the recovering replica recovers from the specified current replica, a write request is received from the source that updates a value of at least one data item, the write request having an associated write sequence number and wherein each data item belongs to a cluster of one or more data items and each cluster has an associated cluster sequence number, the cluster sequence number being the write sequence number of the write request that last modified any of the data items in the cluster, then updating a stored value of the data item and a stored associated cluster sequence number with the received updated value of the data item and its associated write sequence number, respectively; and forwarding the write request with its associated write sequence number to the recovering replica; and scanning clusters stored by the current replica and sending to the recovering replica during the recovery period the value of each stored data item within a cluster and the cluster's associated cluster sequence number if the cluster sequence number associated with the cluster is higher than the low count received from the recovering replica.

12. The method of claim 11 wherein if a write request that updates the value of at least one data item is received from the source, and the cluster to which that data item belongs has already been sent to the recovering replica during the recovery period, then only the write request and its associated write sequence number are forwarded to the recovering replica, but if the cluster to which that data item belongs has not already been sent to the recovering replica, then each of the data items in the cluster to which that data item belongs and the cluster sequence number is forwarded to the recovering replica, the cluster already being updated by the write request.

13. The method of claim 12 wherein if during the scanning of clusters a cluster is determined to have already been sent to the recovering replica during the recovery period, then that cluster is not sent to recovering replica even if that cluster's sequence number is higher than the low count.

14. The method of claim 11 wherein the data items, the cluster sequence numbers, and the low count are stored by the current replica in at least one non-volatile storage device.

15. The method of claim 11 wherein a write request updates one or more data items, the write sequence number associated with the one or more data items being the write sequence number of the write request.

* * * * *